(12) United States Patent
Rasmussen

(10) Patent No.: US 9,346,220 B2
(45) Date of Patent: May 24, 2016

(54) METHOD OF MANUFACTURING AN ORIENTED FILM FROM ALLOYED THERMOPLASTIC POLYMERS, APPARATUS FOR SUCH MANUFACTURE RESULTING PRODUCTS

(76) Inventor: Ole-Bendt Rasmussen, Walchwil (CH)

( * ) Notice: Subject to any disclaimer, the term of this patent is extended or adjusted under 35 U.S.C. 154(b) by 1538 days.

(21) Appl. No.: 10/554,119

(22) PCT Filed: Apr. 26, 2004

(86) PCT No.: PCT/EP2004/004687
§ 371 (c)(1),
(2), (4) Date: Oct. 18, 2006

(87) PCT Pub. No.: WO2004/094129
PCT Pub. Date: Nov. 4, 2004

(65) Prior Publication Data
US 2007/0082188 A1    Apr. 12, 2007

(30) Foreign Application Priority Data

Apr. 24, 2003   (GB) .................................. 0309315.0

(51) Int. Cl.
*B32B 27/04* (2006.01)
*B29C 49/08* (2006.01)
(Continued)

(52) U.S. Cl.
CPC ............. *B29C 67/24* (2013.01); *B29C 47/0007* (2013.01); *B29C 47/0021* (2013.01);
(Continued)

(58) Field of Classification Search
CPC .......... B29C 47/00; B32B 1/04; B32B 21/02; B32B 27/42; B32B 27/10; D01D 1/10
USPC ......... 264/177.2, 171; 428/68, 292, 294, 370, 428/107, 475, 213, 220, 215, 474, 524, 518, 428/522, 297.4
See application file for complete search history.

(56) References Cited

U.S. PATENT DOCUMENTS

| 2,262,989 A | 11/1941 | Conklin |
| 3,735,579 A * | 5/1973 | Catlos .............................. 57/260 |

(Continued)

FOREIGN PATENT DOCUMENTS

| EP | 0337719 A | 10/1989 |
| JP | 57110422 A | 10/1982 |

OTHER PUBLICATIONS

Definition of "Polymer alloy" by Reinforced Thermoplastics: Compositions, processing and Applications; Kelleher; Jun. 2015.*
(Continued)

*Primary Examiner* — Jennifer Chriss
*Assistant Examiner* — Ricardo E Lopez
(74) *Attorney, Agent, or Firm* — Robert W Strozier

(57) ABSTRACT

A blend of two partly incompatible polymers is extruded to form a film under conditions such that the alloy in the blend comprises fibrils extending mainly in one direction, the width and thickness of each fibril having a mean lower than 5 μm, the fibrils being formed of the polymer component having a higher melting point, and the fibrils being surrounded by a matrix of the second polymer, which has a lower coefficient of elasticity. The special morphology is achieved by providing grids in a grid chamber upstream of the exit orifice of the extrusion die, and by sequential hot stretching at a temperature at which the higher melting polymer is at least partly crystalline, and cold stretching, at which both polymers are substantially solid. The second, cold stretching step, is carried out under conditions to give an elongation at break at 20° C. of at least 25%. The films are of particular value for forming crosslaminates having high shock resistance. Preferably the polymer forming fibrils is polypropylene and the polymer forming the matrix is an ethylene polymer, preferably LLDPE.

46 Claims, 18 Drawing Sheets

(51) Int. Cl.
*B29C 67/24* (2006.01)
*B29C 47/00* (2006.01)
*B29C 47/06* (2006.01)
*B29C 47/14* (2006.01)
*B29C 47/70* (2006.01)
*B29C 55/00* (2006.01)
*B29C 55/06* (2006.01)
*B29C 47/12* (2006.01)
*B29C 47/88* (2006.01)
*B29K 23/00* (2006.01)
*B29K 67/00* (2006.01)
*B29K 77/00* (2006.01)
*B29K 105/00* (2006.01)

(52) U.S. Cl.
CPC ......... *B29C47/0026* (2013.01); *B29C 47/0057* (2013.01); *B29C 47/065* (2013.01); *B29C 47/145* (2013.01); *B29C 47/705* (2013.01); *B29C 55/00* (2013.01); *B29C 55/065* (2013.01); *B29C 47/0019* (2013.01); *B29C 47/12* (2013.01); *B29C 47/8845* (2013.01); *B29K 2023/0625* (2013.01); *B29K 2023/086* (2013.01); *B29K 2023/12* (2013.01); *B29K 2067/00* (2013.01); *B29K 2077/00* (2013.01); *B29K 2105/0088* (2013.01); *Y10T 428/24995* (2015.04)

(56) References Cited

U.S. PATENT DOCUMENTS

| | | | |
|---|---|---|---|
| 3,954,933 A | 5/1976 | Rasmussen | |
| 4,039,364 A | 8/1977 | Rasmussen | |
| 4,084,028 A | 4/1978 | Rasmussen | |
| 4,115,502 A | 9/1978 | Rasmussen | |
| 4,125,581 A | 11/1978 | Rasmussen | |
| 4,143,195 A | 3/1979 | Rasmussen | |
| 4,207,045 A | 6/1980 | Rasmussen | |
| 4,229,394 A | 10/1980 | Rasmussen | |
| 4,243,463 A * | 1/1981 | Gash | 156/324 |
| 4,293,294 A | 10/1981 | Rasmussen | |
| 4,294,638 A | 10/1981 | Rasmussen | |
| 4,368,017 A | 1/1983 | Rasmussen | |
| 4,377,544 A | 3/1983 | Rasmussen | |
| 4,403,934 A | 9/1983 | Rasmussen | |
| 4,407,877 A | 10/1983 | Rasmussen | |
| 4,420,451 A | 12/1983 | Rasmussen | |
| 4,421,810 A | 12/1983 | Rasmussen | |
| 4,422,837 A | 12/1983 | Rasmussen | |
| 4,430,284 A | 2/1984 | Rasmussen | |
| 4,436,568 A | 3/1984 | Rasmussen | |
| 4,440,709 A | 4/1984 | Rasmussen | |
| 4,465,724 A | 8/1984 | Rasmussen | |
| 4,492,549 A | 1/1985 | Rasmussen | |
| 4,629,525 A | 12/1986 | Rasmussen | |
| 4,636,417 A | 1/1987 | Rasmussen | |
| 4,767,488 A | 8/1988 | Rasmussen | |
| 4,793,885 A | 12/1988 | Rasmussen | |
| 4,874,653 A | 10/1989 | Rasmussen | |
| 4,908,253 A | 3/1990 | Rasmussen | |
| 5,019,439 A * | 5/1991 | Momose | 428/178 |
| 5,028,289 A | 7/1991 | Rasmussen | |
| 5,205,650 A | 4/1993 | Rasmussen | |
| 5,248,366 A | 9/1993 | Rasmussen | |
| 5,330,133 A | 7/1994 | Rasmussen | |
| 5,361,469 A | 11/1994 | Rasmussen | |
| 5,626,944 A | 5/1997 | Rasmussen | |
| 6,326,411 B1 * | 12/2001 | Desarzens et al. | 521/91 |
| 6,344,258 B1 | 2/2002 | Rasmussen | |
| 6,630,231 B2 * | 10/2003 | Perez et al. | 428/297.4 |
| 6,787,206 B2 | 9/2004 | Rasmussen | |
| 6,887,503 B1 | 5/2005 | Rasmussen | |
| 7,001,547 B2 | 2/2006 | Rasmussen | |
| 7,132,151 B2 | 11/2006 | Rasmussen | |
| 2004/0070105 A1 | 4/2004 | Rasmussen | |
| 2004/0247730 A1 | 12/2004 | Rasmussen | |
| 2005/0095411 A1 | 5/2005 | Rasmussen | |
| 2005/0118304 A1 | 6/2005 | Rasmussen | |
| 2007/0082188 A1 | 4/2007 | Rasmussen | |
| 2007/0254120 A1 | 11/2007 | Rasmussen | |
| 2007/0257402 A1 | 11/2007 | Rasmussen | |
| 2007/0290416 A1 | 12/2007 | Rasmussen | |
| 2008/0035714 A1 | 2/2008 | Rasmussen | |
| 2009/0206510 A1 | 8/2009 | Rasmussen | |
| 2009/0233041 A1 | 9/2009 | Rasmussen | |

OTHER PUBLICATIONS

PCT International Search Report.

* cited by examiner

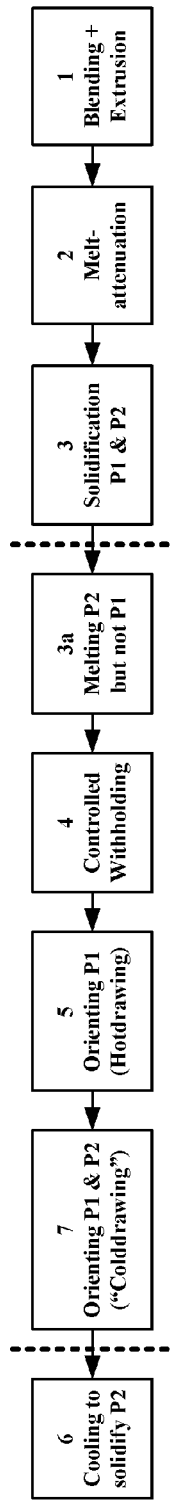
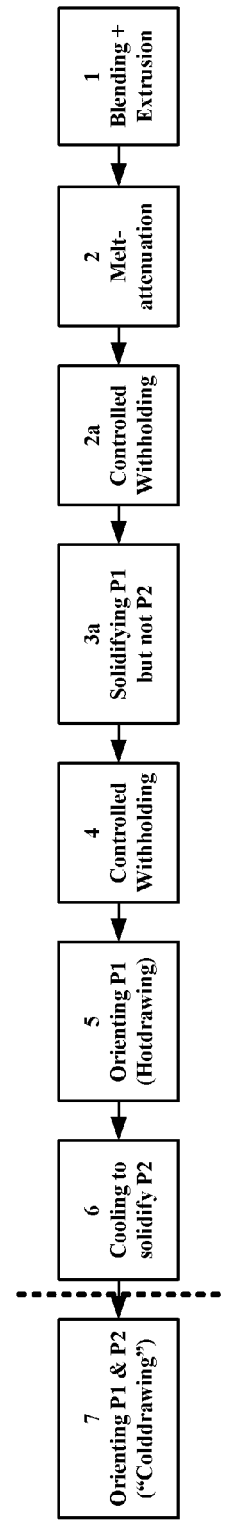
FIG. 1
FIG. 2

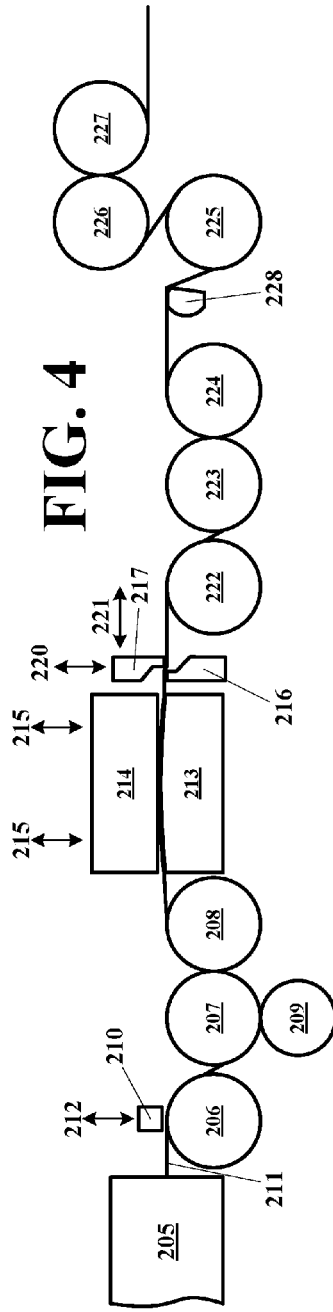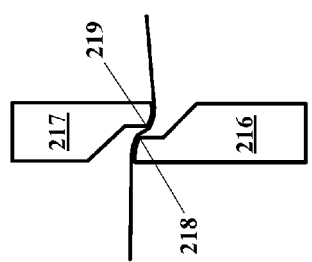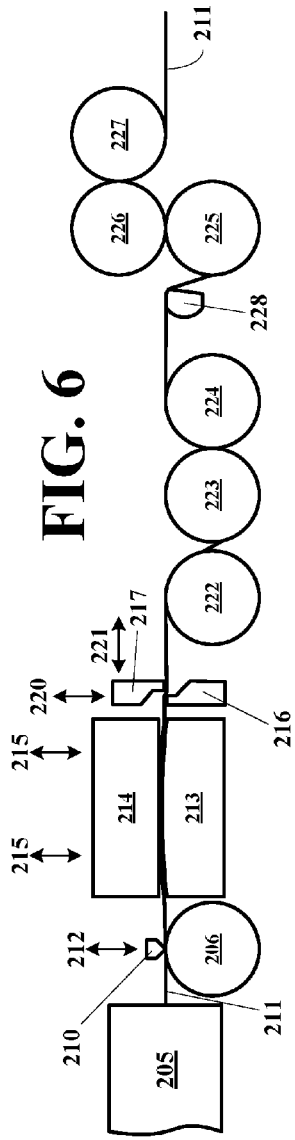

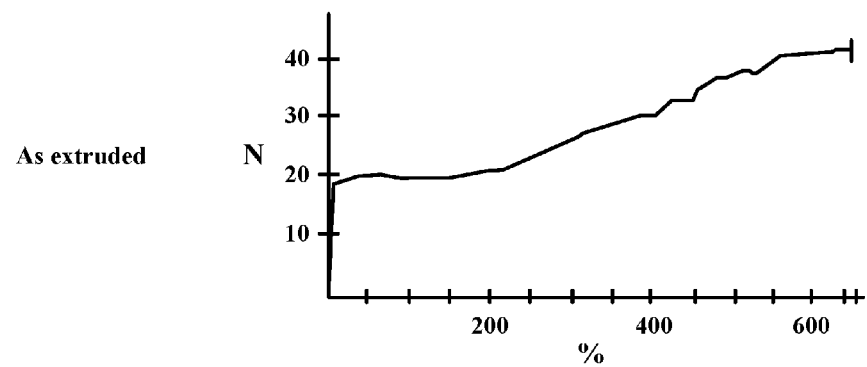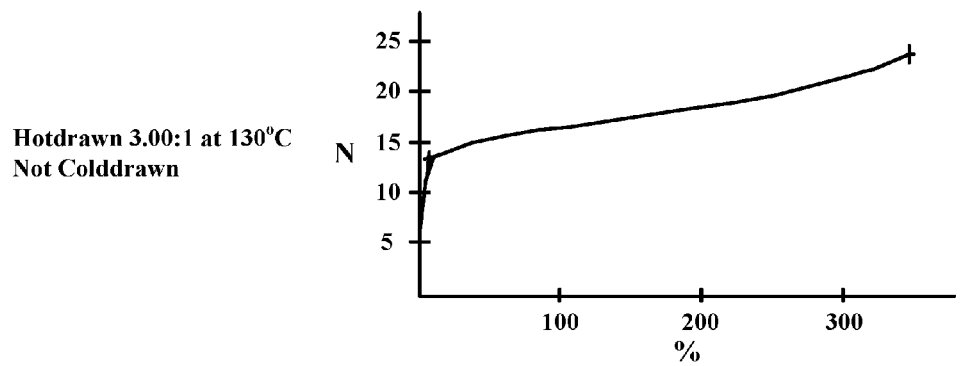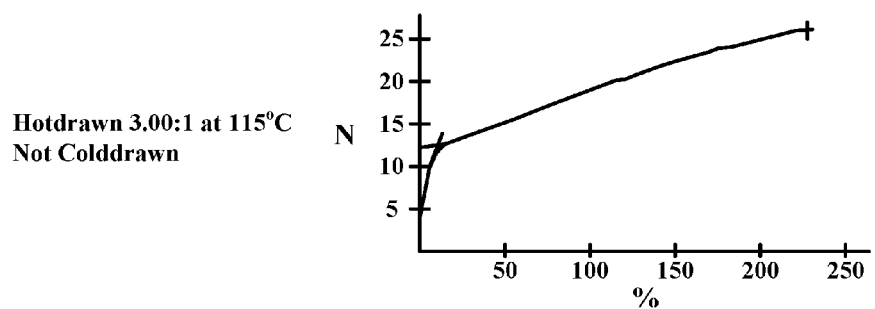
FIG. 9a

20% PP – 80% LLDPE
Hotdrawn 3.00:1 at 130°C
Colddrawn at 2.00:1
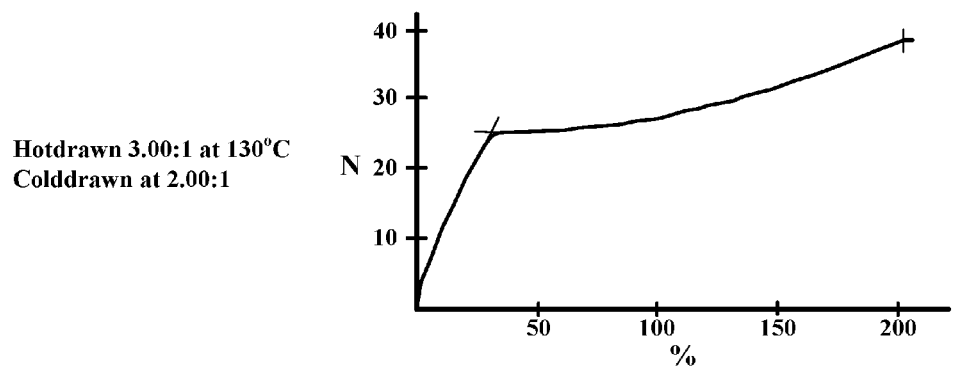
Hotdrawn 3.00:1 at 115°C
Colddrawn at 2.00:1
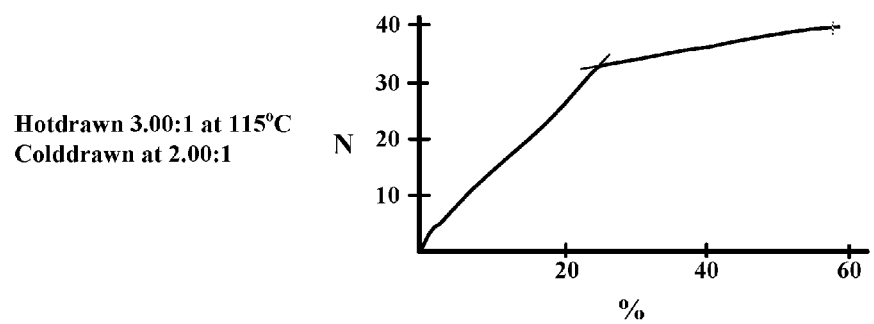
FIG. 9b

20% PP – 80% LLDPE
Hotdrawn 3.00:1 at 130°C
Colddrawn at 1.50:1
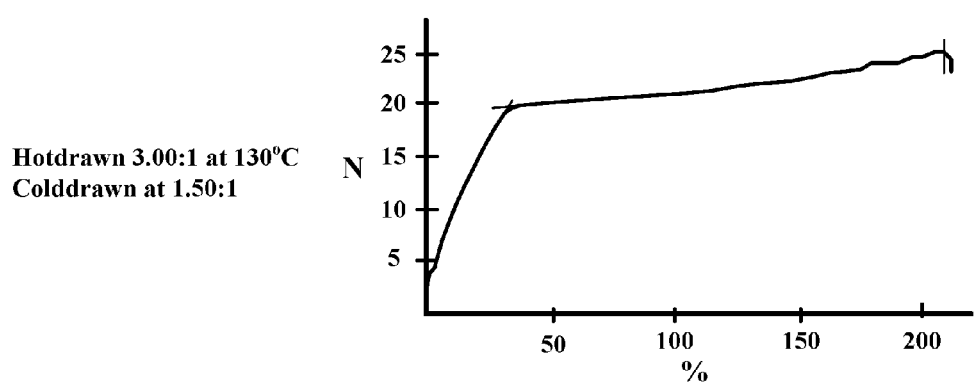
Hotdrawn 3.00:1 at 115°C
Colddrawn at 1.50:1
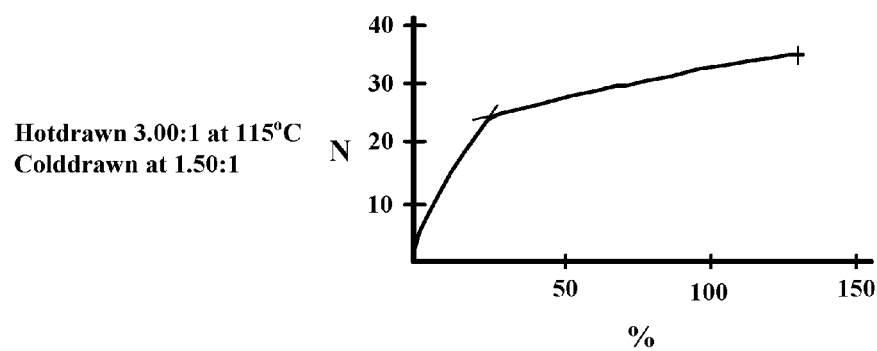
FIG. 9c

33% PP – 67% LLDPE
Hotdrawn 3.00:1 at 130°C
Colddrawn at 2.00:1
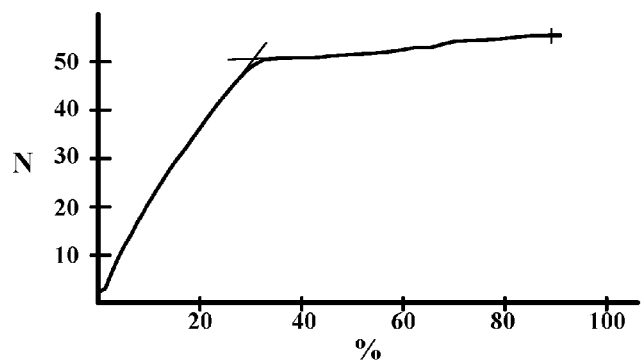
Hotdrawn 3.00:1 at 115°C
Colddrawn at 2.00:1
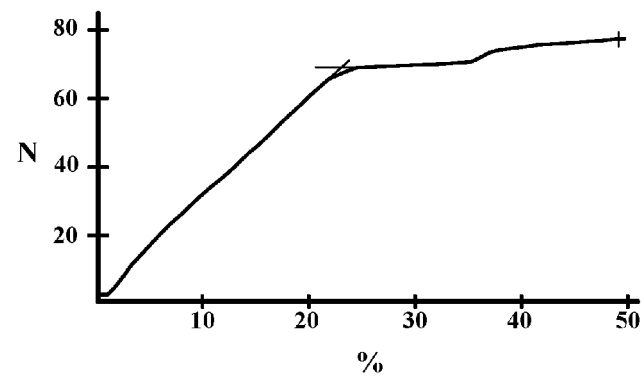
FIG. 10b

33% PP – 67% LLDPE
Hotdrawn 3.00:1 at 130°C
Colddrawn at 1.50:1
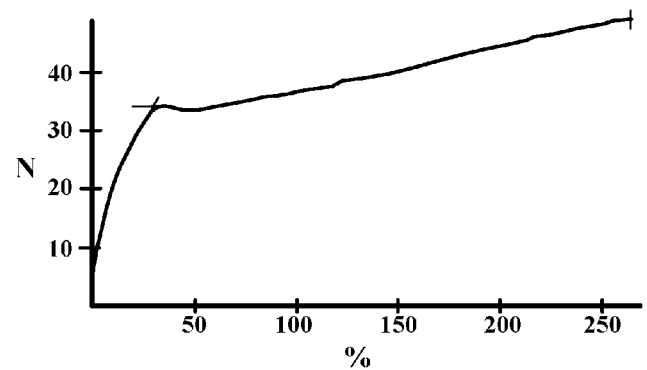
Hotdrawn 3.00:1 at 115°C
Colddrawn at 1.50:1
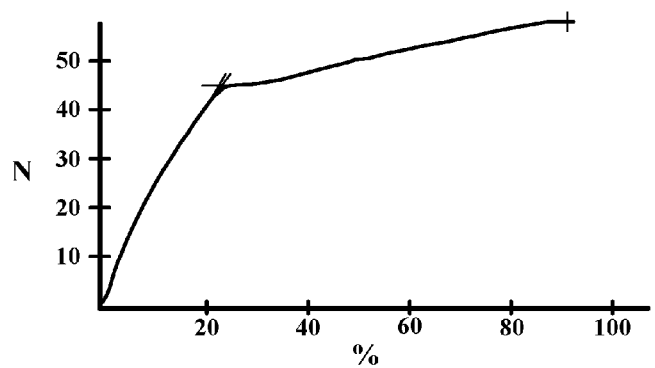
FIG. 10c

50% PP – 50% LLDPE
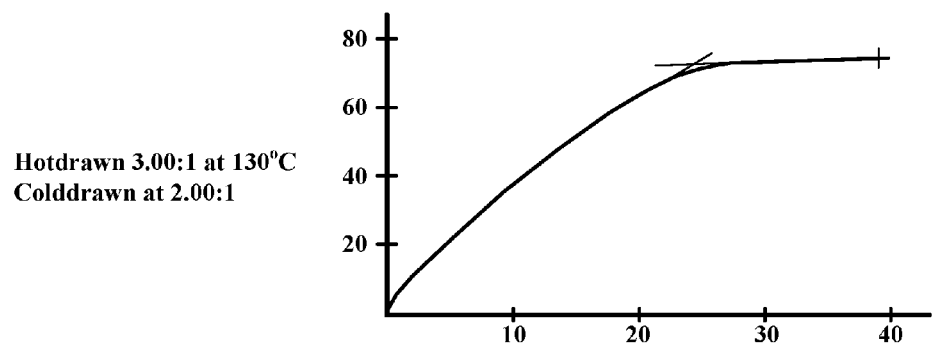
Hotdrawn 3.00:1 at 130°C
Colddrawn at 2.00:1
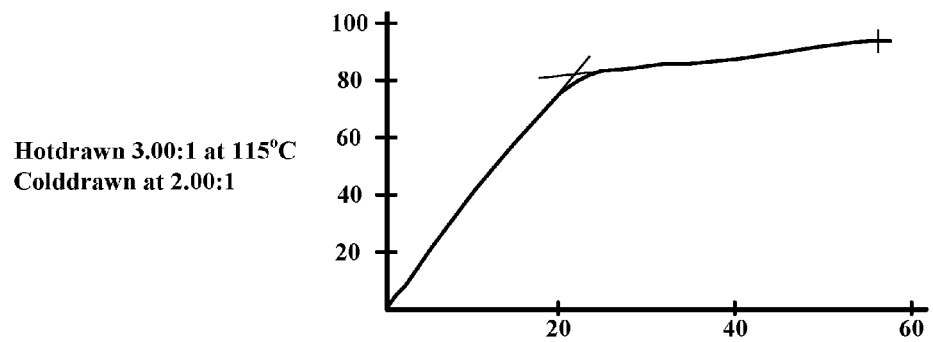
Hotdrawn 3.00:1 at 115°C
Colddrawn at 2.00:1
FIG. 11b

50% PP – 50% LLDPE
Hotdrawn 3.00:1 at 130°C
Colddrawn at 1.50:1
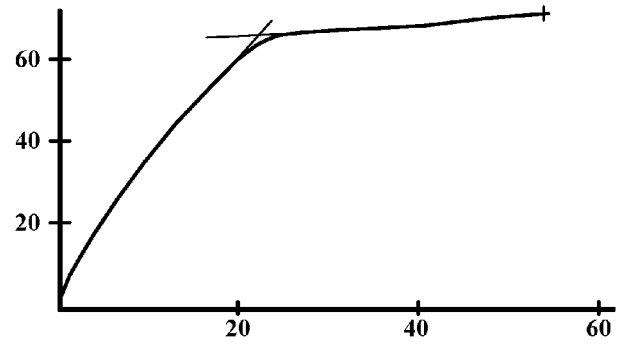
Hotdrawn 3.00:1 at 115°C
Colddrawn at 1.50:1
FIG. 11c

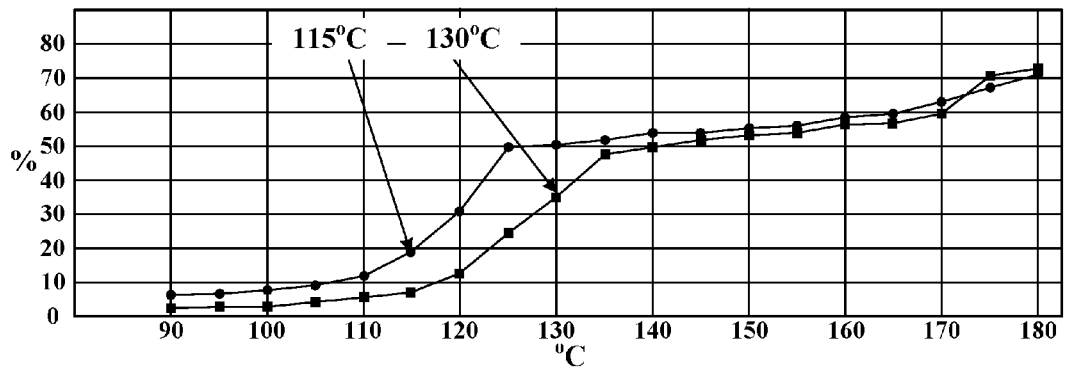
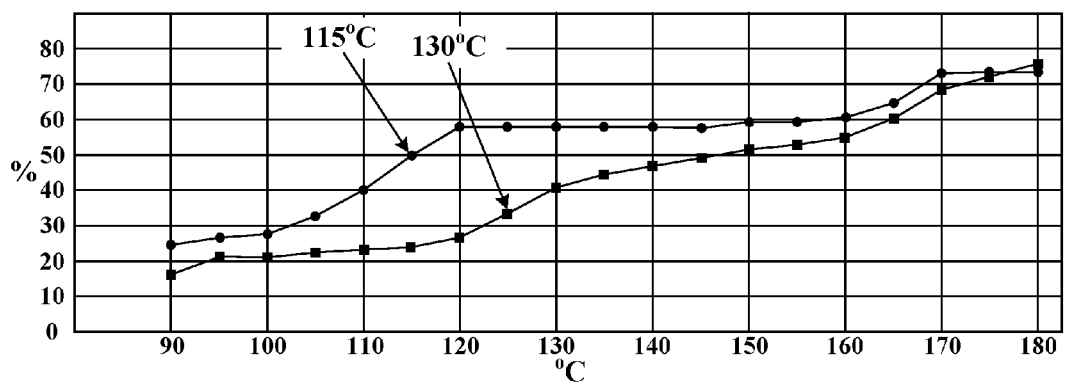
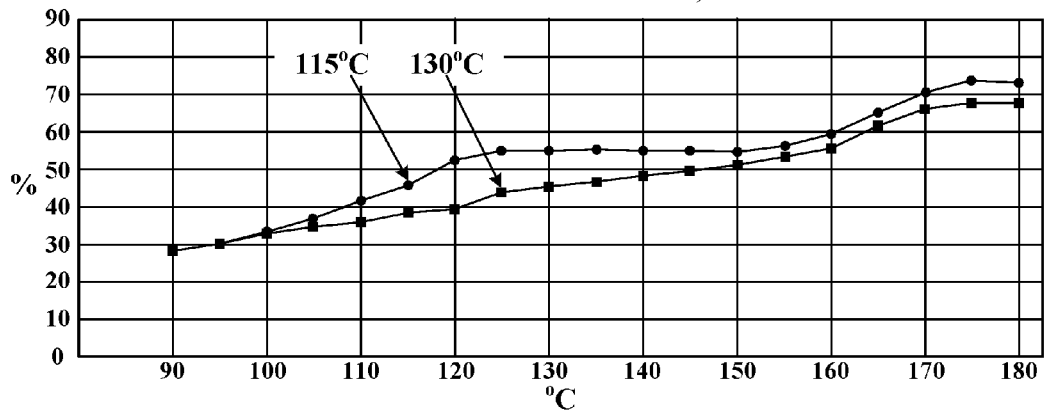
FIG. 12b

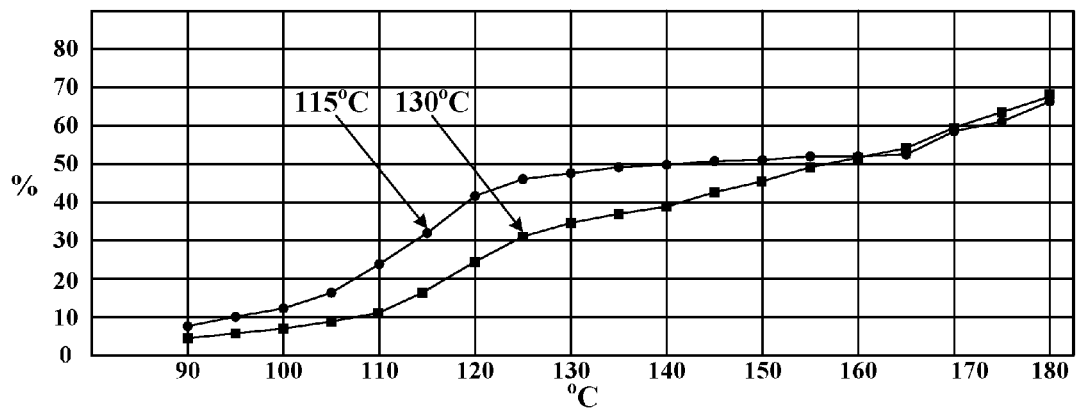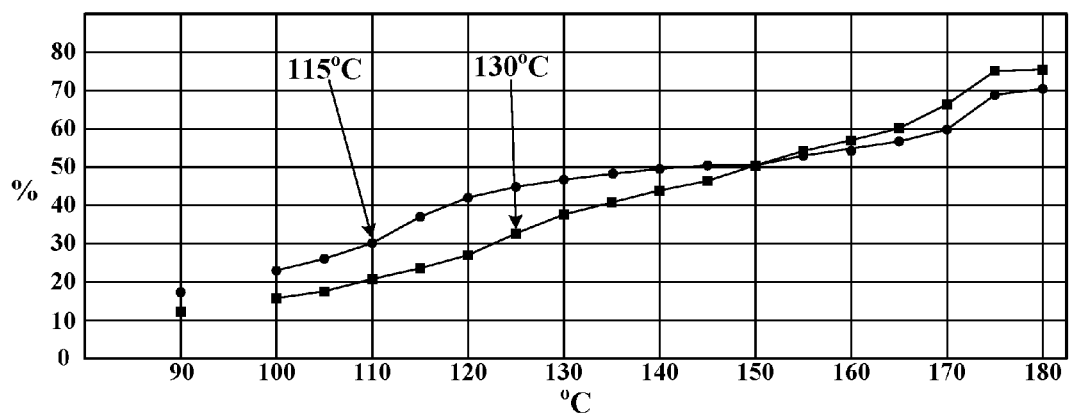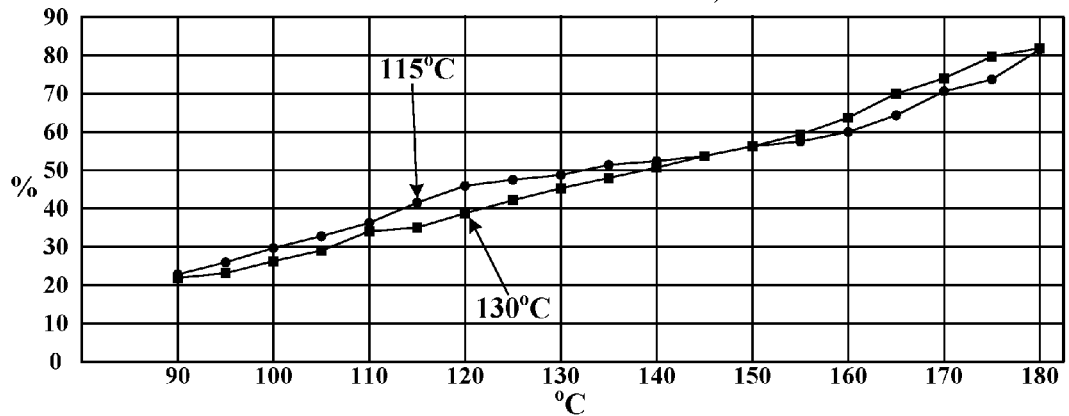
FIG. 12d

METHOD OF MANUFACTURING AN ORIENTED FILM FROM ALLOYED THERMOPLASTIC POLYMERS, APPARATUS FOR SUCH MANUFACTURE RESULTING PRODUCTS

This application is a 35 U.S.C. §371 national phase filing of PCT Application Serial No. PCT/EP2004/004687 filed Apr. 26, 2004 published as WO2004094129 on Nov. 4, 2004, which claims priority to and benefit of GB 0309315.0 filed Apr. 24, 2003.

The invention concerns novel, oriented morphologies and special kind of orientation in a polymer alloy and is conceived with special view to film used for crosslamination and film used for manufacture of rope, twine or woven tape fabrics.

One objective is to improve the mechanical performance of the product at elevated temperatures and in this connection improve the heatseal properties.

Another objective is formation of a morphology which optimizes creep properties without sacrificing energy absorption properties.

A third objective is the formation of-a morphology comprising microscopic or submicroscopic thin ribbon-formed fibrils, which promote is barrier properties or enable an improved action of expansion agents.

A fourth objective is, based on suitable morphology, to facilitate and improve transverse orientation of thermoplastic film, especially with a view to a rationalized, in-line manufacture of crosslaminates.

The manufacture of rope, twine, and woven technical products, all based on uniaxially oriented, slit film, can in many instances be rationalized if the film get suitable heatsealing properties. Furthermore, for many uses there exists a need to achieve improved tensile energy absorption in such products without being forced to use high-cost polymers, such as polyamides. Finally, the formation of a fine cellular expanded structure in oriented tape may open new market opportunities.

Crosslaminates from oriented thermoplastic polymer films present the advantage that suitable combinations of different types of high strength properties can be achieved at relatively low cost, e.g. based on cheap polyolefins such as polyethylene or polypropylene. The cost saving comes from reduction of the gauge, and thereby of the raw material consumption, but this must be weighed against the cost of the orientation, stretching and crosslamination processes. The different types of required strength properties for a film are, e.g. the ultimate tensile strength, the yield tension, the creep properties at room temperature and at elevated temperatures, the energy absorption, tear propagation resistance, puncture strength and heat-seal strength, all four last mentioned properties by slow testing as well as under shock-wise testing. A film or film laminate which exhibits excellent strength in some respects may show a very poor strength in other respects. As an example, a crosslaminate of films, which are uniaxially oriented by stretching up to near the breaking point, will exhibit excellent tensile strength, yield tension and creep properties, but very poor energy absorption, tear propagation resistance under shock-wise testing conditions and heat-seal shock strength. Suitable compromises of different types of strength properties have been achieved by the choice of polymer compositions, the stretch ratios and other stretching conditions, by using unbalanced biaxial orientation instead of uniaxial orientation and/or by the choice of angles between the main directions of orientation in the different films of the laminate.

Such crosslaminates have been manufactured on a large industrial scale since 1968 mainly based on the inventor's old patents, but in stiff competition with other film materials and with woven tape fabrics, there still exists an essential need to rationalize the carrying out of the process in order to reduce the manufacturing costs and/or to make it more versatile, so that by simple change of the process parameters, different strength properties or combinations of strength properties can be optimized.

The crosslaminates have been or are being used for bags, flexible intermediary bulk containers, tarpaulins and cover sheet, liners under buildings, pond-liners, as substitute of geotextiles, and as greenhouse film.

Two different process sequences are used industrially. One consists in extruding a tubular film while giving it a high longitudinal melt orientation, further monoaxially stretching the solidified tube in flat form at a relatively low stretch ratio, helically cutting the tube to convert it to a web which is oriented on the bias, and continuously laminating two such webs between rollers such that the directions of orientation in the two webs are oppositely biased. The lamination can be an extrusion lamination or, if the films have been coextruded, may be by heat with the use of lamination layers.

The patent basis for this manufacturing method and resultant product is GB-A-0,192,976 and GB-A-0,816,607 (and corresponding patents).

In another process sequence used industrially, there are first coextruded tubular films each with a main layer consisting of a blend of selected polymers and minor layers partly serving as lamination layers and partly as heat-seal layers for the final laminate. During the haul-off from the extrusion device the tubular films are given a strong melt orientation mainly in the direction of extrusion. Without any further stretching carried out, the tubes are helically cut, continuously crosslaminated by heat and pressure in a roller apparatus and, in the same apparatus, biaxially oriented. The transverse component of this orientation is carried out between several pairs of intermeshing grooved rollers. The patent basis for this manufacturing method is GB-A-1,526,722 (and corresponding patents). Since this is particularly relevant in connection with the present invention, the main method claim shall hereinafter be paraphrased.

It concerns a method of making a laminate comprising extruding at least two layers of molten polymeric blend, each layer comprising a blend of polymers that are incompatible such an extent that on solidification comprises a dispersion of particles of one polymer in a matrix of another polymer, attenuating each layer while molten before, during or after extrusion to distort the particles in each layer into a fibrillar grain structure having a predominant direction of splittability after solidification into a film, bonding the layers with the said predominant directions transverse to each other, solidifying the layers if they are not already solidified, and biaxially orienting the resulting laminate by orienting it in substantially uniaxial steps. Hereby the biaxial orientation is conducted at a temperature sufficiently low to maintain the predominant direction of splittability of each film and the bonding is sufficiently weak to permit local delamination of the film upon tearing of the laminate.

A preferred embodiment involves transverse stretching between grooved rollers. Improvements on this stretching method and preferable selections of polymers appear from U.S. Pat. Nos. 4,629,525, 5,028,289 and 5,626,944.

Practical ways of carrying out the helical cutting are described in U.S. Pat. No. 5,248,366. As it also appears from this patent publication, a biased melt-orientation forming an angle at up to about 30° to the longitudinal web direction of a tubular film can be produced by a relative rotation between the annular extrusion device (or the exit of this device) and the means which haul off the tubular film from this device, whereby the orientation becomes helical. This provides a possibility to manufacture a crosslaminate fully in line, using two coextrusion lines each with a rotating circular die, longitudinally cutting each tubular film, and uniting the two cut films, each with its direction of orientation on bias, in one stretching/laminating line.

However, the limitation to about 30° orientation in each film is an essential drawback.

Presently all industrial manufacture of cross-laminates does, to the knowledge of the inventor, take place in separate steps instead of in-line, and this has important influence on the economy of the manufacture. Conceivably one could laminate a longitudinally oriented film with one which has been transversely stretched in a tenterframe, but experience has shown that the strength properties produced by known tenter frame technique are unsuited for most applications of cross-laminates. As it already has been mentioned, a solution of this problem is one of the objectives of the present invention.

Heat-sealing of crosslaminates with a simple "peel-type" seal as normally used for pillow bags or side-gusseted bags also presents a problem. Solutions to this problem are suggested in U.S. Pat. No. 5,205,650, EP-A-1,007,331 and WO-A-0196102.

However, the two first mentioned inventions suffer from the drawback that special equipment is needed in the company which carried out the conversion of the film to heat-sealed products (e.g. bags) and thus can be a serious marketing limitation for the manufacturer of the film. In the last mentioned invention the solution concerns features only in the composition and manufacturing process of the cross laminated film, but further improvements of the heat-sealing properties of such film are still highly desirable. As mentioned above this is also an objective of the present invention.

Another serious problem has been the flimsiness of a crosslaminate which is made in the low gauges which are allowed by the improvements of strength properties. Stiffness and resilience is particularly important in the manufacture and/or automatic handling of bags. This problem is partly solved in the above mentioned U.S. Pat. No. 5,626,944 which discloses a ribbed structure of the laminate in which each rib has a cross-section like a very shallow U, formed by a special execution of the transverse stretching between grooved rollers.

A more radical solution is disclosed in WO-A-02/102592 in which at least one of the films of the laminate forms flutes like the flutes in corrugated paperboard, generally with a wavelength between about 1 mm and 3 mm.

The present invention can be carried out either additionally to or supplementally to the process steps which are referred to in the foregoing description of known crosslamination technology.

A first aspect of the present invention is based on the concept that the fibrillar grain structure mentioned above is given a strong orientation at a temperature at which the fibrils are solid while the surrounding polymer material (which in solid state also normally is at least partly crystalline) is molten. In particular the method involves orientation over a frictional surface while the part-molten film is hauled off from the extrusion device, although it also is possible first to solidify, later partly re-melt the film and then perform the stretching. After this hot stretching and after solidification of the entire film composition with mainly the fibrils oriented, the film is preferably further stretched at a lower, preferably much lower, temperature. Such subsequent cold stretching will normally rupture the fibrils or fibril network at microscopic intervals along the length of the fibrils, while the film material on the whole remains intact, the film having a degree of elongation before it breaks than a film not having been subjected to this cold stretching. This state has been found to provided improved yield tension and creep properties without adverse effects on tensile energy absorption and behavior of the film under shock, e.g. shock-tearing or shock-puncturing, a discovery which is further described below.

The feature that the higher melting fibrils have a much higher degree of orientation than the surrounding lower melting polymer material also provides the film with improved strength properties at elevated temperatures, and in particular improved heat-sealing properties. It has been found that an essential part of the strength-generating orientation in P1 is maintained above the melting point of P2, in this connection the shrink-testing of examples of the invention below.

The first aspect of the present invention is a further development of the method and apparatus, which the inventor has disclosed in WO03/033241. This earlier case discloses extrusion of a tubular film over an annular frictional device of controllable temperature, adapted to produce longitudinal orientation while the temperature in the flow is kept within or slightly above the crystallization range of the flow of polymers. An embodiment of that invention is characterized in that the polymer flow contains a blend of at least two compatible or compatibilized polymers, and the main proportion of the orientation takes place while one is predominantly in crystalline state and the other is predominantly in molten state. The friction which controls the orientation, can be adjusted by air lubrication with air pressed through holes in the frictional device or through microporous metal, or alternatively by sucking the flow against the frictional device. The surface which the flow contacts may also have a grooved pattern, the grooves being circular around the die axis and being subjected to a controlled under-pressure.

Upstream of the frictional device there may be a generally annular, cylindrical or conical shock-cooling part, preferably also lubricated by air lubrication, through microporous metal or through holes. Furthermore, between this shock-cooling part and the frictional device there may be a temperature-fine-adjustment part, preferably similarly air lubricated.

The publication of this disclosure took place on the same date as the priority forming first filing of a patent application regarding the present invention, and therefore it is not prior art to the claims of the present application. The disclosure in WO03/033241 is incorporated herein by reference. The drawings and the description of the drawings of the present application, which almost in entirety were used again in the first filing of the present invention.

It is further noted that the disclosure in WO-A-03033241
a) does not deal with the morphology of the alloy in the film,
b) does not mention any subsequent stretching process, and
c) is limited to extrusion and connected stretching of tubular film, while the present invention relates to extrusion and connected stretching of flat as well as tubular film.

The method according to the first aspect of the present invention shall now be more precisely defined. It comprises the following steps and selections which are known in themselves.

The oriented film is formed of an alloy of at least two polymers P1 and P2 and is manufactured by blending the polymers and, extruding and stretching the blend. Both polymers are at least partly crystalline at temperatures under about 100°C., whereby P1 has a mechanically determined melting point which is at least 20° C. higher than the mechanically determined melting point of P2. These polymers are incompatible to such an extent that they exist as separate phases in the alloy in the final film, but are compatibilized sufficiently for practical purposes either by use of an alloying agent or mechanically by sufficient mixing. P2 in its unoriented state at 20° C. exhibits a coefficient of elasticity (E) which is at least 15% lower than E of P1. By adaptions of rheological conditions, percentages of the components, and mixing and stretching conditions the alloy is produced which is a dispersion of microscopically fine fibrils or fibril network of P1 surrounded by P2, wherein each fibril extends mainly in one direction and generally has width and thickness such that the mean of these two dimensions is around or lower than 5 μm. The stretching takes place partly by draw-down after extrusion of the film while both components are at least partially molten, and partly by a later step to form strong orientation.

The features which characterized the first aspect of the invention are as follows: after said draw-down (also termed attenuation or hot attenuation, below) the film is hot stretched while P1 is in solid state and P2 substantially molten to selectively orient P1, while limiting the orientation to an extent which allows the film to become at least 25% elongated in the direction of orientation by slow drawing at 20° C. whereby this hot stretching is carried out by drawing the film over a frictionally withholding device (frictional device).

"Selectively orient" does not mean that P2 does hot become oriented, it always will do so to some extent.

After the described hot stretching the film is preferably further stretched while both components are solid (cold stretching). The resultant orientation is hereby limited so that the product film can be elongated at least 25% in any direction by slow drawing at 20° C. "Slow drawing" refers to stretching of narrow, e.g. 15 mm wide specimens at a velocity corresponding to about 50% elongation per minute. This characteristic is also referred to as the elongation at break.

In order for polymer P2 to exert its energy absorbing properties properly the coefficient of elasticity E for this polymer material in its unoriented state must as mentioned be at least 15% lower than E for polymer material P1 in the unoriented state of P1. However, it will in many cases be more preferable to choose P2 with a still lower E seen in relation to P1, e.g. such that its E is 25% lower than that of P2, 50% lower or even lower than this.

For the sake of good order it should be mentioned that part of the blending may take place already during manufacture of the polymerizates before the polymers P1 and P2 have been isolated, or thereafter in a separate manufacturing location or step.

Preferably polymers P1 and P2 should be compatible or compatibilized to such an extent that the final film will not shown any tendency to develop internal voiding upon repeated flexing. As mentioned above this compatibilisation can be by the use of an alloying agent, or more economically by making the cross-sectional dimensions of the fibrils sufficiently small, since the tendency to internal voiding is dependent on these dimensions.

Suitable examples of polymers for use in the invention are:

P1: propylene polymers including crystalline copolymers of propylene, or polyamide, or polyethylene terephthalate, and P2: propylene copolymer, or ethylene polymers including crystalline copolymers of ethylene, e.g. with other alphaolefins.

When the film is made for manufacture of a crosslaminate, it is preferably a coextruded film which, on the side which will face another ply in the laminate, has a lamination layer selected to facilitate or control the bonding. Furthermore it is most advantageous that the outermost plies of the laminate each will comprise a coextruded modifying layer forming a surface of the entire laminate, selected to facilitate and/or improve heatsealing of the laminate and/or modify its frictional properties or printing characteristics.

It would appear that an oriented film as described above could be made by a simple modification of the process which is described in U.S. Pat. No. 3,949,042 (Utz). According to this patent a crystalline polymer is solidified by cooling while it passes through the exit part of an extrusion device, and is oriented by the pull of the haul-off means as it leaves the exit orifice. Further according to the patent the passage of the solidifying and solidified polymer through the exit channel is made possible by "lubrication" with minor layers of a lower melting polymer, which is coextruded on both sides of the major polymer before the cooling begins. The patent also suggests that the extruded, oriented film can be used to make a crosslaminate. On the face it would therefore appear that the film of the present invention could be manufactured by Utz's method, if the higher melting polymer is substituted by a suitable blend such as used in the present invention. However, as a person with skills in extrusion technology will easily understand, the film made by the U.S. Pat. No. 3,949,042 will be so distorted in its structure that it is not practically applicable. Over a length during its passage through the exit channel the flow will remain molten in its core, but will have solidified in thin regions on both sides hereof. In spite of the "lubrication" this makes a regular laminate flow impossible since the solidified regions will buckle and thereby disturbs the laminated structure. The resultant product will exhibit an extremely rough surface and extreme thickness variations. In case the flow of crystallizable polymer is substituted by a flow of a fibrillar dispersion, this chaos effect will result in a disturbance of the fibrillar character of the structure.

It should also be mentioned that a patent from about 1975 issued to the Dutch Van Leer organization or one of its subsidiaries (the inventor has not at the time of filing this application been able to identify it further) concerns longitudinal orientation of the extruded tube in solid state over a mandrel inside the tube, while the latter is hauled-off from the extrusion die. However in practice it is very difficult to carry out this method due to strong contraction forces which are set up when the solid film is drawn, and which acts to hold the tube firmly to the mandrel.

Finally it should be mentioned that mandrels inside the extruded tube have been widely used for calibration of the tube. As examples reference is made to GB-A2112703 and to EP-A-028536B.

Reverting to the description of the present invention it has been found important for obtaining the desired fine fibrillar structure, either to maintain a reasonable high tension in the flow of mutually dispersed polymer-in-polymer blend during the passage through the extrusion die, or to increase the fineness of the dispersion by suitable means shortly before the flow leaves the die. Preferably the conditions are adapted to make the fibrils flat with thickness generally around or lower than 1 μm, more preferably generally around or below 0.5 μm, and still more preferably generally around or lower than 0.1 μm, while the width is made generally around or lower than 5 μm. Most advantageously the reduction of the cross dimensions of the fibrils comprises the step of passing the molten blend, during extrusion, through at least one screen or grid located in a chamber immediately upstream of the exit orifice of the extrusion device, which chamber has a gap bigger than the gap of the exit orifice. The best results are obtained when each such grid has walls extending several millimeters in the direction of and preferably substantially parallel to the flow as it enters the grid. The major walls in each such grid are preferably slanted so that each forms an angle between about 10° to about 70° to the major surface of the flow entering the grid. Most advantageously there is used at least two such grids which are slanted in opposite directions in relation to the major surface of the flow entering the grid.

Preferably the said angle and the wall thickness and distances between the walls are such that in a longitudinal section of the die perpendicular to the major surface of the blend flow as this enters the grid, there are at least four such walls.

The formation of a fibrillar, oriented morphology in a polymer alloy, with the fibrils flat and thin as here described, and in this connection the use of the described grid chamber at the end of the extrusion die will be referred to as the second aspect of the present invention. It is considered to be inventive in itself, independent of the use in connection with a subsequent stretching of the crystallized fibrils as in the first aspect. This morphology with the highly attenuated, very flat fibrils, can provide crosslaminates and slit-film products with improved strength properties, independent of the special features of the first aspect. Furthermore it can be used to manufacture crosslaminates, slit film and other film products, e.g. films with a fine cellular, expanded structure. Finally the extended, very flat polypropylene microfibrils, alloyed into a film of linear low density polyethylene (LLDPE) can render a film highly oil resistant, while very flat polyamide microfibrils, also alloyed with LLDPE can do the same and further provide good barrier properties against oxygen. This second aspect of the present invention shall be dealt with in more detail below.

Going back to the first aspect of the invention, this can be carried out in different sequences of steps. In one sequence the film is after the extrusion and preferable hot-draw-down, and while both P1 and P2 are molten, cooled to solidify both, and in a later step heated in air-lubricated engagement with a heating body of controlled temperature to melt at least in part P2, while keeping P1 solid. Immediately thereafter while P2 is still at least partially molten and P1 is solid, the film is subjected to the selective orientation of P1, i.e. cold stretching and then solidification of P2. The frictional device preferably comprises one or more bars with rounded edges over which the film is dragged while following an adjustable arc of the edge, and the bar or bars are maintained at a temperature which prevents the film from sticking to the edge or edges. The length of travel in contact with the edge or edges is adapted to prevent P2 wholly solidifying. An example of such frictional device, suited for film extruded in flat form, is shown in FIG. 5 herein, and another example, suited for tubular film, is shown in FIG. 6 of the mentioned WO03/033241.

At least the process steps from and including extrusion to and including the solidification of P2 are preferably carried out in-line, whereby the line also comprises a hold-back device, e.g. similar to one of those mentioned above, acting between the cooling and the subsequent heating, and preferably the process steps following solidification of P2 are also carried out in-line with the former process steps.

This sequence of steps from extrusion, preferably additionally including the blending step, to the drawing which takes place while both P1 and P2 are solidified, hereafter called the cold stretching or cold drawing, is shown in the flowsheet FIG. 1. The two interrupted lines in the drawing indicate that the sequence may be interrupted usually by spooling the film, after the first solidification, of P1, and/or after the second solidification, of both components, but preferably all steps are carried out in-line. A cutting of the film to form uniaxially oriented tape, if this is the end product, is also preferably carried out in immediate succession. Similarly, crosslamination may be carried out immediately after the cold stretching, and this shall be further described in a later section. The cold stretching step (indicated by a box "Cold drawing" in the flowchart FIG. 1) may comprise longitudinal as well as transverse stretching, and may comprise several steps.

When flat film is extruded for this sequence of steps, the controlled hold-back between cooling and subsequent heating is preferably established by a roller arrangement, which also may supply the cooling. This is illustrated in the drawing FIG. 4.

However, as mentioned the film may also be formed and treated in tubular form at least from and including extrusion and at least to and including the final solidification of P2. Also in this case the controlled hold-back between cooling and subsequent heating can be established by one or more circular bars (rings) with rounded edges over which the film is dragged while following an adjustable arc of the rounded edge, while the bar or bars are maintained at a temperature which prevents the film from sticking to the edge or edges. This device can also be constructed like that shown in FIG. 6 of WO03/033241.

This means with reference to FIG. 3 of WO03/033241, that there will be a frictional device not only at the end of the shown line (see reference numeral 118) but also between the shock cooling part (116) and the temperature-line-adjustment part (117). Each one can be constructed like the said frictional device (118) or as shown in FIG. 6, both from the WO document.

The heating is preferably carried out with the film in air-lubricated engagement with two heating bodies, one on each side of the film. The spacing between said heating bodies should preferably be adjustable. This is also illustrated in the drawing FIG. 4 herein. In an alternative sequence of steps, cooling of the film immediately after the extrusion is limited to solidification of P1, while P2 is kept at least partially molten. Immediately thereafter, the selective orientation of P1 over a frictionally withholding device is carried out with P1 in a crystalline state and P2 at least partially molten. This sequence of steps is shown in the flowsheet FIG. 2. Also in this case, the frictionally withholding device may comprise one or more bars with rounded edges over which the film is dragged while following an adjustable arc of the edge, whereby the temperature of the bar or bars and the length of travel in contact with the edge or edges is adapted to prevent P2 wholly solidifying.

The cooling to the state in which P1 has become solid while P2 remains at least partially molten, is preferably carried out by air-lubricated engagement of the film with a cooling body of controlled temperature. Also in this case the film should preferably be in air-lubricated engagement with two temperature controlling bodies one on each side of the film. The spacing between said heating bodies should preferably be adjustable.

As regards the orientation after full solidification of both components, the cold stretching, at least a first step is preferably carried out in the same longitudinal direction as the previous hot stretching of the film. By a suitable selection of the conditions for the different stretching processes, and optionally by addition of finely dispersed fracture-promoting material to the extruded blend, the longitudinal cold stretching is preferably adapted to produce locations of rupture of the P1 fibrils and, in connection with such rupture, extra orientation of P2 in and around the said locations. Hereby the locations will have a generally linear extension at an angle to the direction of orientation. This is illustrated in FIG. 8.

This feature serves to give the film, and tape or crosslaminates made from the film, improved creep properties and yield point without sacrificing the energy absorption properties, a matter which shall be further disclosed below in the example in connection with comparative strain/stress graphs. The experimental facts are explained by the controlling effect which the oriented fibrils of P1 exert on the development of orientation in P2.

In order to optimize the combination of creep/yield resistance and good energy absorption properties, it was found that the longitudinal cold stretching preferably should be carried out at around 50° C. or at a lower temperature, e.g. 30° C. or even lower. A heat-treatment for annealing may follow.

After the longitudinal cold stretching, transverse cold stretching can be carried out, preferably under allowance of a simultaneous longitudinal contraction. The longitudinal contraction is preferably achieved by forming transverse pleats in the film prior to the transverse stretching, which may be established by means of a tenterframe. However, transverse cold stretching may optionally be carried out without preceding longitudinal cold stretching, preferably while the film is allowed to shrink in the longitudinal direction. Also in this case, the contraction can be achieved by forming transverse pleats in the film prior to the transverse stretching, and this can be carried out by means of a tenter frame.

With known tenter frame technology and using known film compositions, it has not been possible to manufacture a transversely oriented film which is suited as a layer in crosslaminates, useful for normal applications, the reason being that it has not been possible to achieve a suitable combination of yield/creep resistance and good energy absorption properties. This is now solved by use of the present invention. Therefore the manufacture of crosslaminates can be rationalized—as compared to the existing manufacture which as mentioned in the introduction makes use of spiral cutting of longitudinally oriented tubular film—in such way that one film is produced with longitudinal and another with transverse orientation, whereafter the two are laminated, all taking place as one in-line production process. Further information about the carrying out of the transverse orientation is described in connection with FIGS. 7a,b and c.

In the first aspect of the present invention it is essential that the higher melting polymer P1 forms fibrils or fibril network (the occluded or dispersed phase) surrounded by the lower melting polymer P2 (the matrix).

In this connection the following guidelines can be given. The lower the concentration of P1, the higher the probability that it will become the occluded phase (when other things are not changed).

The higher the melt viscosity of P1 is as compared to P2 —under the given conditions of melt attenuation—the higher the probability that P1 becomes the occluded phase (when other features are not changed). It is hereby noted that P1 undergoes an increase in melt viscosity near to its point of solidification, and the inventor has established some evidence indicating that slow cooling may convert a P2-in-P1 dispersion into a P1-in-P2 dispersion. It is also likely that such conversion can take place during the crystallization of P1. Preferably the weight proportion of P1 in the mixture is less than 75%, more preferably in the range 5 to 60%, for instance in the range 10 to 60, most preferably in the range 20 to 50%.

However, when it is feasible it is advisable to obtain the P1-in-P2 occlusion by use of relatively high molecular weights for the polymer of P1 to give it a suitably high melt viscosity (e.g. a melt flow index of at least 0.1 preferably about 0.5), or by the use of relatively low concentrations of this component, then solidify both components by a quick cooling (as further described in connection with the shock-cooling and devices therefor) so that the melt-attenuated structure becomes fixed, since a slow cooling seems to produce fibrils of more irregular shape and therefore of lower strength.

For the sake of good order it should be mentioned that, if the invention is used to produce a crosslaminate, the lamination may be carried out prior to the cold stretching, and if the extruded and hot stretched film is tubular, spiral cutting may be used as it normally is done (see the introduction).

The second aspect of the method according to the present invention shall now be described more exactly. It concerns a method of extruding and attenuating thermoplastic polymer material, which comprises an intimate blend of polymer material P1' and polymer material P2', through a die to form a film or sheet of an alloy, in which the flow passage through the die comprises an exit orifice having an exit gap, and the method is characterized in that upstream from the exit orifice there is provided a grid chamber comprising one or more grids through which the blend passes. The grid or grids have apertures of a size selected to reduce the average size of the dispersed phase of P1' or P2' in the blend. The grid or grids are located at a position in the chamber where the gap is wider than the said exit gap, and the grid chamber further comprises a gap reduction portion between the screen and the die exit wherein the gap through which the blend flows is reduced at least part way to the gap of the die exit.

The preferred features of this die has already been clearly described in connection with the first aspect of the invention.

For most uses of the film product there is preferably coextruded a surface layer at least on one side of the blend flow. This is best done before the flow meets the grid or grids, since the latter then can help to compatibilize the blend of the main layer and the surface layer.

Independently of the first aspect of the present invention, this second aspect can be used to improve strength properties of alloyed, oriented film.

This method is characterized by the following features: P1' and P2' are incompatible to such an extent that they exist as separate phases in the final film, but are compatibilized sufficiently for practical purposes either by use of an alloying agent or mechanically by sufficient mixing and attenuation, and P2' in its unoriented state at 20° C. exhibit a coefficient of elasticity (E) which is at least 15% lower than E of P1'. Preferably but not necessarily the mechanically determined melting point of P1 is at least about 20° C. higher than that of P2'. By adaptions of rheological conditions, percentages of the components, and conditions for mixing and attenuation, the alloy is formed substantially as a dispersion of microscopically fine fibrils or fibril network of P1' surrounded by P2', whereby each fibril extends mainly in one direction and generally has a thickness around or lower than 5 μm, preferably around or lower than 1 μm, and still more preferably around or lower than 0.1 μm and width at least 5 times its thickness. Furthermore the film is stretched after at least P1' has been solidified.

By a random blending technique (as the blending always will be carried out in practice) to form microscopically or submicroscopically fine fibrils of one polymer occluded in another polymer as matrix, it will always be impossible to give the fibrils cross sectional dimensions which are even along their width, since the fibrils disturb each other's regularity, except if their concentration in the matrix is very low. This and irregularities caused by the crystallization of the very fine fibrils has a negative influence on the strength of the resultant film. However, in very flat fibrils these effects are to some extent evened out, especially when the alloy has been rapidly cooled, and therefore the second aspect of the present invention in itself presents an advantage relating to the strength of the produced film, and of tape or crosslaminates made from this film.

In this use of the second aspect of the invention, a step of the stretching after solidification may be transverse to the direction of the fibrils. Preferably the film is then allowed to contract in the direction of the fibrils during this stretching. The possibilities for contraction can be established by a preceding fine transverse pleating of the film. This step of stretching transverse to the direction of the fibrils can also be preceded by stretching in the direction of the fibril while the latter are solid.

As regards the choice of polymers for this strength promoting use of the second aspect of the invention, P1' can e.g. consist of propylene polymers including crystalline copolymers of propylene or propylene homopolymer, or polyamide, or polyethylene terephthalate, and P2' can e.g. mainly consist of a propylene copolymer, or ethylene polymer including copolymers of ethylene, preferably with other alpha-olefins, P2' preferably comprising linear low density polyethylene.

In another embodiment of the second aspect of the invention, which has been mentioned above, P1' is chosen to exhibit desirable barrier properties. This use is further characterized by the following features:

P1' and P2' are incompatible to such an extent that they exist as separate phases in the final film, but are compatibilized sufficiently for practical purposes either by use of an alloying agent or mechanically by sufficient mixing and attenuation. By adaptions of rheological conditions, percentages of the components, and conditions for mixing and attenuation, the alloy is formed substantially as a dispersion of microscopically fine fibrils or fibril network of P1' surrounded by P2', whereby each fibril generally extends in one main direction and generally has a thickness around or lower than 5 μm, preferably around or lower than 1 μm, and a width at least 5 times its thickness.

It is well known that flake-shaped particles, e.g. mica powder exerts a barrier effect, since it forces the penetrating molecules of gas, aroma substance, or harming liquid to diffuse like in a labyrinth. However, such flakeshaped particles will normally have a negative influence on the strength of the film unless its concentration and therefore effect is low. Normally barrier properties therefore are achieved by coextrusion, including optionally coextrusion of tie layers, together with the main layer of the film. When two heatseal layers also are required, the die must normally be constructed for no less than 6 layers, or in case 2 barrier layers are needed, for 9 layers. Such dies are commercially available but expensive. Under use of the second aspect of the invention, one, two or more barrier forming polymers, P1'a, P1'b etc, can be alloyed with the main polymer P2' without any use of the expensive tie-polymers. If special surface layers for heatsealing are not required this mean that a simple 1-component die is sufficient when additionally supplied with the described grid chamber. If surface layers for heatsealing are required, a 3 layer coextrusion die is needed, but in any case the saving in investment is very important. Of course the barrier effect is not quite at high as achieved with the expensive dies, but good enough for many purposes. Examples of applicable barrier polymers:

Polypropylene or polyethylene terephthalate can protect crosslaminates, which mainly are based on polyethylene, against destruction by oil, nylon 6 or 66 can do the same and also form a barrier against oxygen, and EVOH can very efficiently form barrier against oxygen oil and most aroma substances.

Finally, as already mentioned the method according to the second aspect of the invention can with advantage be used to make film with a fine cellular, expanded structure, especially for conversion to tape or crosslaminates. This use is characterized by the following features:

P1' and P2' are incompatible to such an extent that they exist as separate phases in the final film, but are compatibilized sufficiently for practical purposes either by use of an alloying agent or mechanically by sufficient mixing and attenuation.

By adaptions of rheological conditions, percentages of the components, and conditions for mixing and attenuation the alloy is formed substantially as a dispersion of microscopically fine fibrils or fibril network of P1' surrounded by P2', whereby each fibril extends mainly in one direction and generally has a thickness around or lower than 5 μm, preferably around or lower than 1 μm and width at least 5 times its thickness. There is added an expansion agent prior to or during the extrusion, which agent is soluble in P2' but generally not in P1', whereby expansion is established after the extrusion step.

Since the expansion agent is generally not soluble in P1', the fibrils act as barriers to the expansion agent, thereby they strongly promote an efficient and fine expansion. The film (or tapes made by slitting of the film) may additionally be strongly oriented prior to, during or after the expansion and they may be converted to split fibre network e.g. by rubbing action as known in the art of making split fibers (fibrillated film).

As it already appears from the foregoing, the new methods described above can be used to manufacture the following novel products A, B and C. All three are especially conceived for use in crosslaminates, A and C also especially for rope, twine and woven-tape products, and product C is further especially conceived for conversion to split fibre—(fibre-from-film) products.

In the following description reference is made to polymers P1 and P2, i.e. as described above in connection to the first aspect of the invention. The description however relates equally to blends of P1' and P2' and products produced therefrom by the second aspect.

Product A: Known features are as follows:

It is an extruded film made from an alloy of at least two polymers P1 and P2, which both are at least partly crystalline under about 100° C., and are incompatible to such an extent that they exist as separate phases in the film, but are compatibilized sufficiently for practical purposes either by use of an alloying agent or mechanically by sufficiently mixing. P2 in its unoriented state at 20° C. inhibits a coefficient of elasticity (E) which is at least 15% lower than E of P1, and the alloy is formed substantially as a dispersion of microscopically fine fibrils or fibril network of P1 surrounded by P2. In this morphology, each fibril extends mainly in one direction and generally has width and thickness which as an average between these two dimensions is around or lower than 5 μm.

Characterizing features are the following alternatives, which also can be combined:

a) the P1 fibrils are flat and generally parallel with the main surfaces of the film with thicknesses generally around or lower than 1 μm and a width at least 5 times the thickness, b) the oriented film exhibits locations of rupture of the P1 fibrils, which locations have a generally linear extension angularly to the direction of orientation.

As important examples P1 may consist of polypropylene including crystalline copolymers of propylene, or of polyamide, or polyethylene terephthalate, and P2 may mainly consist of a propylene copolymer, or polyethylene including crystalline copolymers of ethylene, preferably linear low density polyethylene.

There should normally be a minor coextruded surface layer on at least one side of the alloyed layer to enhance bonding properties and/or modify the frictional properties.

Product B, an expanded product, exhibits the following known features:

It is an extruded film made from an alloy of at least two polymers P1 and P2, which both are at least partly crystalline under about 100° C., and are incompatible to such an extent that they exist as separate phases in the final film, but are compatibilized sufficiently for practical purposes either by use of an alloying agent or mechanically by sufficient mixing and attenuation. The alloy is formed substantially as a dispersion of microscopically fine fibrils or fibril network of P1 surrounded by P2, whereby each fibril extends mainly in one direction.

Characterizing features are as follows:

the fibrils of P1 are flat and generally parallel with the main surfaces of the film with thicknesses generally around or lower than 1 μm and a width at least 5 times the thickness, and further more P1 is chosen to exhibit desirable barrier properties.

The barrier forming polymer P1 may e.g. consist of EVOH, or polyvinylidene chloride including copolymers of vinylidene chloride, or polyamide.

There should normally be a minor coextruded surface layer on at least one side of the alloyed layer to enhance bonding properties and/or modify its frictional properties.

Product C is a cellular expanded film may be extrusion under use of an expansion agent. It comprises the following novel features:

The expanded film is made from an alloy of at least two polymers P1 and P2, which both are at least partly crystalline under about 100° C., and are incompatible to such an extent that they exist as separate phases in the final film, but are compatibilized sufficiently for practical purposes either by use of an alloying agent or mechanically by sufficient mixing. The alloy is formed substantially as a dispersion of microscopically fine fibrils or fibril network of P1 surrounded by P2, whereby each fibril extends mainly in one direction and is flat with thicknesses generally around or lower than 1 μm, and a width at least 5 times the thickness.

The invention shall now be explained in further detail with reference to the drawings.

FIGS. 1 and 2 are flow sheets of two alternative routes of the method according to the first aspect of the invention.

FIG. 4 shows very schematically the machineline corresponding to the flow sheet FIG. 1.

FIG. 5 is a magnification of the frictionally withholding device of FIG. 4, and is shown on a scale which roughly is half the natural scale.

FIG. 6 shows, also very schematically, the machineline corresponding to the flor sheet FIG. 2.

FIG. 7c shows schematically the cross-section of the two narrow ovens of FIG. 7a.

FIGS. 9a to c, 10a to c and 11a to c show stress strain curves for film properties with reference to the examples.

FIGS. 12a to d show graphs of shrinkage performance at raised temperatures for films produced in the examples.

As it already has been mentioned, all drawings of WO 03/033241 and descriptions to these drawings must also be considered as belonging to the present case.

Figure 3A:
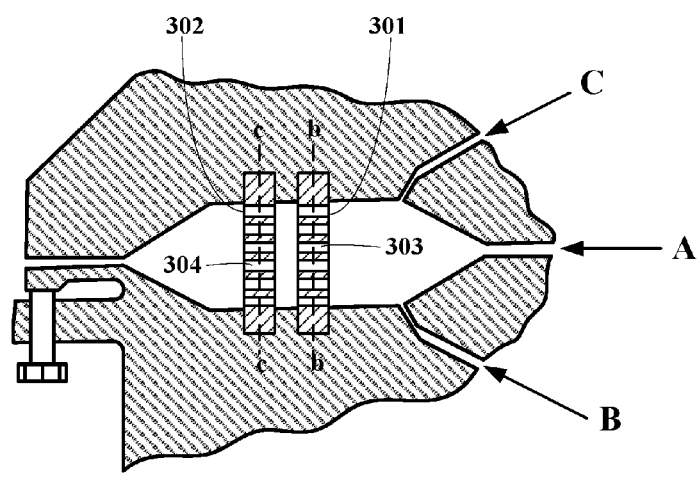
FIG. 3a shows a modification of the exit of a coextrusion die, which may be flat or circular, supplied with two grid-formed screens for the purpose of making the fibrillar dispersion finer and the fibrils pronouncedly flat. The sketch represents a section through a-a in FIG. 3b.

In the flow sheet FIG. 1 and corresponding drawing of the machine line FIG. 4, step 1 normally comprises dry blending of the higher melting polymer is P1 and the lower melting polymer P2, then blending in an extruder, and subsequent forming of film (sheet) in an extrusion die, which immediately upstream of its exit orifice has a grid chamber as shown in FIGS. 3a,b and c. The extrusion is normally a coextrusion adapted to supply the film with suitable surface layers.

If the grid chamber is omitted, as it may be, a separate blending of the components in molten state prior to the film extrusion will normally be needed. It is also possible to perform the blending in connection with the polymerization as a part of the manufacture of P1 and P2.

It is essential to reach the microscopic or submicroscopic cross dimensions of the P1/P2 dispersion, which is mentioned in the claims, and also to get P1 in form of fibrils or fibril networks occluded in P2, instead of P2 occluded in P1. Conditions in this connection have been discussed in the general description of the invention and shall briefly be repeated later.

The flowsheet FIG. 1 is applicable to film extruded in flat as well as film extruded in tubular form, while the line shown in FIG. 4 applies only to film extruded in flat form, from the flat die (205). The corresponding processes for film extruded in tubular form appear from the drawings in WO 03/033241.

In the flat carrying-cut of the invention, step 2: melt-attenuation and step 3: solidification P1 and P2, are both carried out by means of the pulling and cooling rollers (206), (207) and (208). These are driven at the same circumferential velocity and are cooled with circulating water or circulating oil. A rubbercoated nip roller (209) forms a nip with the last of the cooling rollers (208). For economical reasons, in case P2 will be melted again (step 3a) without interrupting the processes, the cooling should not be stronger than needed.

A bar (210) through air lubrication presses against the extruded and melt-attenuated film (211). The air lubrication is carried out through microporous metal, which forms the part of the bar adjacent to the roller. The air lubricated bar has two functions, one is to prevent entrainment of air between the film and roller (206), the other to limit the tendency to transverse contraction of the film while this is attenuated. Air entrainment at this stage will ruin the evenness of the film thickness. There are not shown any details in the construction of the bar (210), but this will be obvious for a person skilled in air lubrication. There is no need to heat nor to cool this bar nor the lubricating air.

The double arrow (212) indicates that the position of the bar is adjustable relative to the roller. Preferably there are springs pressing the bar towards the roller, while the pressure of the lubricating air works in opposition thereto, and it is the tension of these springs, and the air pressure which determines the spacing. This spacing between roller (206) and bar (210) should preferably be less than 1 mm. Nevertheless, the edges of the film will always become somewhat thickened due to transverse contraction and it may be necessary to trim off 1 cm or a few cm before step 3a.

Step 3a, melting P2 but not P1, takes place in a special oven consisting of two oven parts (213) and (214). The film (211) is in air lubricated engagement with both. The section of each oven part, which is adjacent to the film, consists of microporous metal, the rest of solid metal with one channel system for distribution of the air, and one for heating with circulating hot oil. The channel systems are not shown here, but similar channel systems are shown in FIGS. 1-5 in WO03/033241. The temperature of the surface of each oven part which is adjacent to the film (211) is exactly controlled. The heating by circulating oil may be substituted by electrical heating. The air may be preheated, but normally its temperature will become precisely adjusted by the passage through the microporous metal, without any preheating.

The double arrows (215) indicate that the spacing between the two oven parts are mutually adjustable to optimize the heating and the effect of the air lubrication. Also in this case, the adjustment preferably takes place through springs which are under an adjustable tension. There are two reasons for using two oven parts (213) and (214) instead of only one (213). One is to achieve the most efficient heating, the other to prevent that the film forms longitudinal pleats as a result of some longitudinal stretching, which will occur at, the downstream end of part (213) where the film is most warm. Without the other oven part (214) this stretching would be accompanied by a transverse contraction, which would cause some pleating at the upstream end of part (213). Another but less efficient way to counteract pleating, is to make the microporous surface or surfaces which engage with the film slightly rounded, e.g. with radius of curvature 1-2 mm, and in FIG. 4 this is also indicated.

The special oven consisting of parts (213) and (214) corresponds to the temperature-fine-adjustment-part (117) in FIGS. 3-5 of WO03/033241, relating to the hot drawing of tubular film. However, to carry out the process shown in the flowsheet, present FIG. 1, these FIGS. 3-5 of WO03/033241 must be supplemented by a suitable "hold-back" device between the shock-cooling part (116) and the temperature-fine-adjustment-part (117). This hold-back device must exert a controlled frictional resistance in order to contribute to the adjustment of the proportion between the melt attenuation (step 2) and the hot stretching (step 5). Each hold-back device for the tubular carrying out of the present invention can be constructed either as part (118) or as shown in FIG. 6, both referring to WO03/033241.

Further in connection with tubular extrusion in the present invention, there does not in this case exist any tendency to pleating of the film while it travels over the microporous parts, since the tubular shape prevents this, but for the sake of efficient temperature adjustment it still is an advantage to effect the heating/cooling from temperature-controlled metal parts on both sides of the film and through air lubrication on both sides. In case the surfaces of these parts are conical (see e.g. the temperature-fine-adjustment part 117 in FIG. 4 of WO03/033241) the adjustment of the spacing in the oven can be established by axial movement of one of these oven parts.

They key part of the stretching processes, namely the hot stretching (step 5) during which P1 is in solid, crystalline state, and P2 at least partially molten, takes place by the frictional withholding exerted by the stretching bars (216) and (217) shown on about natural scale in FIG. 5 (at A4). The film touches only edge regions (218) and (219) of each bar, and these edge regions are rounded with a radius of curvature of a few mm. The bars are mutually adjustable as indicated by the double arrows (220) and (221).

The bars are kept at a temperature which is as high as possible without causing the film to stick so strongly that a smooth passage over the bars is prevented. This often means that the temperature of the bars must be lower than the melting point of the material in the surfaces of the film. On the other hand, P2 in the main body of the film must remain at least partially molten and preferably be able to reheat the solidified surface regions sufficiently for re-melting P2 in these regions when the film has left bar (219). The temperature control of the bars, which consists in cooling except at the start-up, takes place by circulation of water or oil (means not shown).

The hot stretching is established by the pull-rollers (222 and 223) which are driven. A rubbercoated nip roller (224) forms a nip with the second pull roller (223). Rollers (222 and 223) are watercooled steel rollers which solidify P2 (step 6).

Step 7, the cold stretching, i.e. orienting while both P1 and P2 are solid, may be longitudinal or transverse or a combination of both. FIG. 4 shows longitudinal coldstretching. Preferably the film is maintained at a somewhat elevated temperature, e.g. about 50° C., when it leaves roller 224. It is pulled by the cooled, driven rollers (225 and 226). Rubber-coated nip roller (227) forms a nip with the second driven roller (226). The orientation takes place as the film passes and leaves the stretching bar (228). This has a semi-sharp edge, e.g. rounded with radius of curvature of about 0.5 mm, over which the film is drawn. By turning of the bar around the center axis, which is indicated in the drawing, the friction can be varied.

The flowsheet FIG. 2 and corresponding drawing of machine line FIG. 6 show an alternative route for carrying out the first aspect of the invention. This does not first solidify both components and then re-melt P2, but goes directly from step 2, melt attenuation, over a step 2a, controlled withholding, to the step (3a) where P1 is solidified while P2 remains molten.

When working with flat film, as shown in FIG. 6, the controlled withholding (step 2a) which at the same time performs the controlled melt-attenuation, can conveniently take place by means of the cooled roller (206). This is cooled in order to prevent the film from adhering, but the cooling must not be so strong that a substantial portion of the film solidifies. Therefore the film follows the roller over a very short distance, e.g. 1-2 cm. It is pressed against roller (206) by means of an air lubricated bar (210) which is generally similar to the bar (210) in FIG. 4, but it is essential to make the construction so that the surface which faces the film is no wider than about 5-10 mm. This device may be heated in order to avoid excessive cooling of the film during this step.

Although step 3a in FIG. 2 concerns solidification of P1 while keeping P2 at least partially molten, and step 3a in FIG. 1 concerns melting of P2 while keeping P1 solid, both steps are preferably carried out with essentially identical apparatus, namely the described oven parts (213) and (214). All subsequent steps can also be identical.

The route represented by FIG. 1 will normally produce the most regular fibrils of P1 due to the quick cooling, but is applicable only when the melt viscosity of P1 is sufficiently high compared to that of P2, and/or if the concentration of P1 is sufficiently low. Otherwise the route represented by FIG. 2 gives better possibilities for achieving the desired morphology of fibrillar P1 in P2, since (as already mentioned) it has been found that slow cooling may cause an inversion of P2-in-P1 to P1-in-P2 structure.

In FIGS. 3a,b and c in the die the major flow comprising a dispersion of P1 in P2 expands, e.g. from a thickness of about 2.5 mm to a thickness of about 20 mm, and is then coextruded with two minor surface layers which are selected for instance for improvement of bonding, heat-seal properties and/or frictional properties.

Figure 3C:
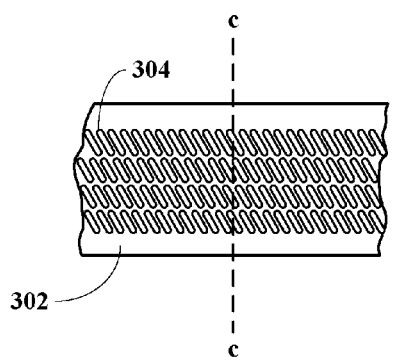
FIG. 3c shows a section through c-c in FIG. 3a. In the case of a circular die these figures show folded-out circular sections.
Figure 3B:
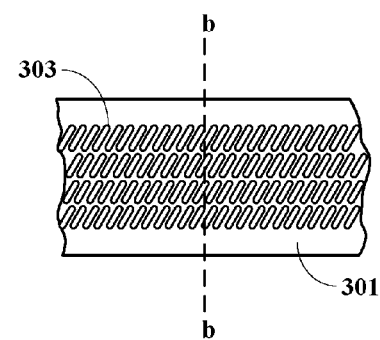
FIG. 3b shows a section through b-b in FIG. 3a, and similarly

The composite flow of the 3 layers in the 20 mm deep grid chamber passes the two grid-like screens (301) and (302), each a few mm thick (e.g. 5-10 mm) portions of which are shown in FIGS. 3b and 3c respectively. Each comprises an array of lamellae (303) and (304) each e.g. about 1 mm thick, and spaced e.g. about 1 mm from each other. Screens (301) and (302) are mirror images of each other so that the flow is sheared most efficiently as it passes.

Immediately following screen (302) the flow is compressed to a thickness, e.g. 2.5 mm which is convenient for its exit from the coextrusion die. Hereby the polymer-in-polymer dispersion becomes further attenuated to form the desired final cross-sectional dimensions of each fibril, and at the same time the die-lines formed by the lamellae (303) and (304) are flattened, generally to form an angle of about 10 to 15° to the main surfaces of the film. The subsequent stretching processes will usually bring the angle down to around 1° or less. These die-lines can often be detected in the final film, e.g. by treating a cross section of the film with a solvent which dissolves P2 but not P1. As an example, if P1 is polypropylene and P2 is LLDPE, 30 minutes' treatment with xylene at 90° C. will develop the die-lines.

After such treatment, the cross dimensions of the flat fibrils can also be studied by scan electron microscopy. Referring to the final film, which has been through all processes shown in FIG. 1, it has been found easy to obtain fibril thicknesses which on the average are lower than 0.1 μm, but of course in random distribution, and corresponding widths which generally are more than 10 times the thicknesses.

In an embodiment in which P1 is homopolypropylene and P2 is LLDPE it was found virtually impossible to dissolve out the LLDPE, except from very thin regions near the major surfaces and deeper regions from the minor surfaces of the investigated specimen. This is explained by the pronounced-flatness of the fibrils, which forces the LLDPE molecules to diffuse through a labyrinth before they can meet a major surface and be extracted. For similar reason, the film can show quite good barrier properties if the grid chamber containing these grids is utilized.

In contrast to this it was found easy to dissolve out almost all LLDPE, with the polypropylene fibrils remaining, when the grid chamber had been removed from the extrusion die, and microscopy investigations then showed only insignificant flatness of the fibrils.

The grid or grids can be made in other shapes than those shown in the drawings, i.e. with lamellae at an angle rather than parallel to the direction of flow, but the shape illustrated has the advantage that the dielines become nearly parallel with the major surfaces of the manufactured film, and furthermore the grid or grids are relatively easy to clean.

Keeping to the grid form shown in FIGS. 3b and c, the achieved flatness of the fibrils depends i.e. on the number of walls which can be counted in a longitudinal section perpendicular to the main surfaces of the flow, such as a-a in these drawings. Preferably this number should not be lower than 4; in the drawing it is 6.

Figure 7A:
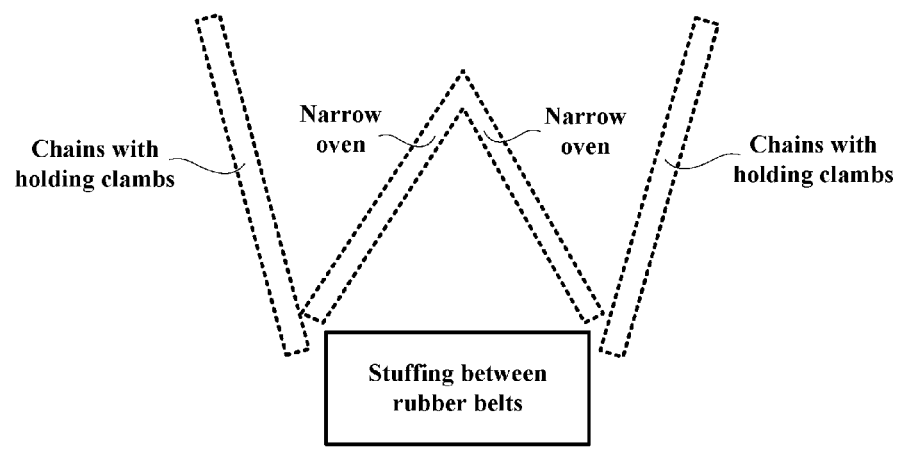
FIG. 7a is a diagram-like representation of a tenterframe showing the preferred way of transverse "coldstretching".

FIGS. 7a,b and c represent the preferred method and apparatus for transverse stretching after solidification of both P1 and P2, optionally preceded by a longitudinal stretching with P1 and P2 in similar states, both processes referred to as cold stretching. The purpose is manufacture of a mainly uniaxially transversely oriented film for subsequent lamination with a mainly uniaxially longitudinally stretched film. The usual tenterframe process is not very suitable in such connection, partly because it requires relatively high stretching temperatures, and partly because it is difficult to limit the amount of stretching. In order to obtain fully satisfactory energy absorbing strength properties in crosslaminates, the stretching temperature should preferably be lower, e.g. around 50° C., and the degree of orientation should be far from the ultimate limit.

Figure 7B:
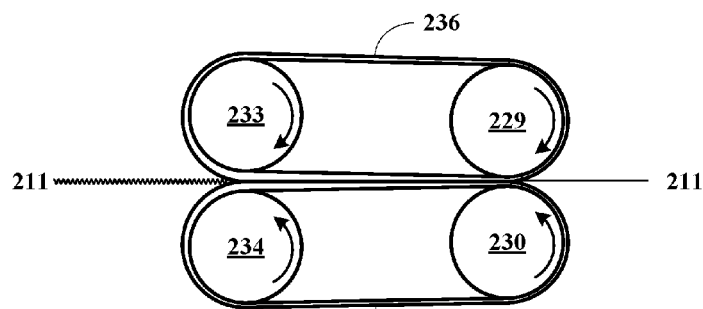
FIG. 7b represent the unit in FIG. 7a which performs the transverse pleating.

To make the transverse orientation generally uniaxial, the film is first supplied with fine pleats, which will enable its longitudinal contraction during the transverse extension. This process step is labelled "stuffing between rubber belts"—see the box in FIG. 7a—and is shown in FIG. 7b. The film (211) is fed into the nip between two rollers (229 and 230) and supported by the two endless rubber belts (231 and 232). It is delivered in pleated form from the nip between two rollers (233 and 234). The first pair of belt rollers (229 and 230) are driven at a circumferential velocity which is significantly higher than that of the second pair of belt rollers (233 and 234) e.g. about twice as high. The ratio between the two velocities is adjustable. Thus the two rubber belts become stretched out when they leave the nip between the second pair of belt rollers (233 and 234) and return to a less stretched state when they leave the nip between the first pair of belt rollers (229 and 230). Since the belts convey the film, the film is stuffed (becomes transversely pleated) between the belts (231 and 232). The degree of pleating should normally be adjusted so that it corresponds with the tendency to longitudinal contraction during the transverse stretching.

Prior to the stuffing process, the film may pass a pair of intermeshing gear rollers, which stretches it incrementally in the longitudinal direction and hereby forms transversely extending thinner lines. The distance between such lines may e.g. be about 0.5-3 mm. Even a small degree of incremental longitudinal stretching will help to produce an even pleating, and furthermore it has been found that the longitudinal stretching zones can acts as initiators for the transverse stretching.

As the pleated film leaves the stuffing device, its edges are gripped by holding clamps in endless tenter-chains (see the schematic sketch FIG. 7a) which can be a conventional tenterframe construction.

The oven construction is new. In known tenterframes the oven which heats the film by means of hot air extends over practically the entire film surface during the entire tentering process. The novel concept of an oven or ovens for a tenterframe is schematically shown in FIG. 7a, and its cross-section is shown in detail in FIG. 7b. The oven consists of two parts (235/236 and 237) made from microporous metal each with support parts (239 and 240) made from compact metal. The component (235) and the part (237) are heated to an appropriate, controlled stretching temperature, e.g. 50° C., by means of electrical heating elements (241). Pressurized air is distributed through the channels (242) between parts 235/236 and 237 on the one hand and the support parts (239 and 240) on the other. The component (236) is not heated, and the air lubrication through this will provide cooling while the air lubrication through channels adjacent parts (235) and (237) will provide heating.

The heated component (235) is insulated from the cooling component (236) by means of a heat insulating wall (246) of compact material. The cooling component (236) is on the side of each oven which faces its nearest tenterchain.

Figure 7C:
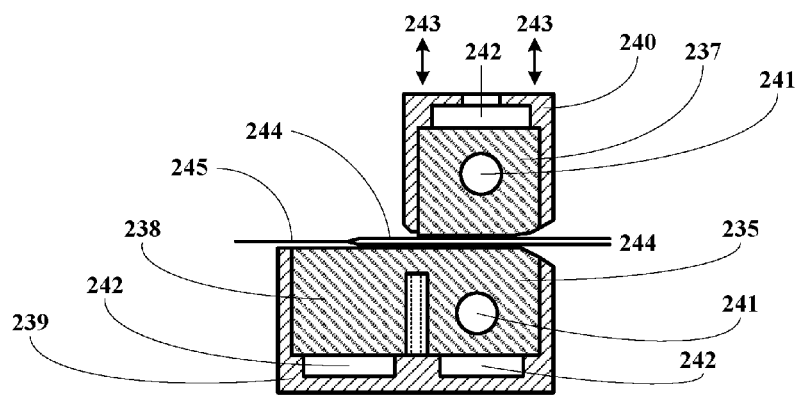

The spacing between components (235) and (237) is adjustable as indicated by the double arrows (243). This adjustment may be a simple setting of the distance, or may be through springs with adjustable tension. A preferable spacing between (235) and (237) is between about 0.5 and 2 mm. FIG. 7c shows the film entering the oven in pleated form (244) at the righthand side and leaving the oven tentered and with the pleats stretched out (245) in the lefthand side.

In a conventional tenterframe oven, the film is stretched simultaneously over its full width, and carrying this out evenly requires a rather high temperature, which is generally not adequate in the manufacture of crosslaminates. With the present constructions, when the parameters are properly adjusted to each other, the tentering takes place within a very narrow zone, a necking zone, usually only a few mm wide or less, located on each of the cooling components (236) of the two narrow ovens shown. Due to the air lubrications, the film moves through the ovens in a frictional manner, while the necking zone gradually develops from a position close to each of the chains with holding clamps towards the middle of the film. Thus all film between a narrow oven and the nearest chain (except a narrow zone near the chain) is fully transversely stretched up to the stretch ratio set, while the film between the two narrow, long ovens are not at all transversely stretched. At the downstream end of the two narrow, long ovens, all the film is generally evenly stretched.

When the stretching conditions are properly set, the necking zone will as mentioned be located on the cooling part. This has the effect that the degree of stretching better can be limited, as is generally desired in the manufacturing of crosslaminates, for the purpose of allowing further stretching under impact actions (shock) on the final product.

As it will be understood, the described tenterframe process is not limited to use in the invention as this is defined in the claims, but it is the best way known to the inventor of utilizing the invention in the manufacture of crosslaminates. As a further aspect of the invention there is provided a method of transverse stretching of films while pleating using the oven arrangement described above and apparatus therefore.

It is further noted that the morphology achieved by the invention, namely the oriented P1 fibrils in a generally unoriented or only coldstretched P2 matrix, has been found to act stabilizing on the tenterframe process.

Figure 8:
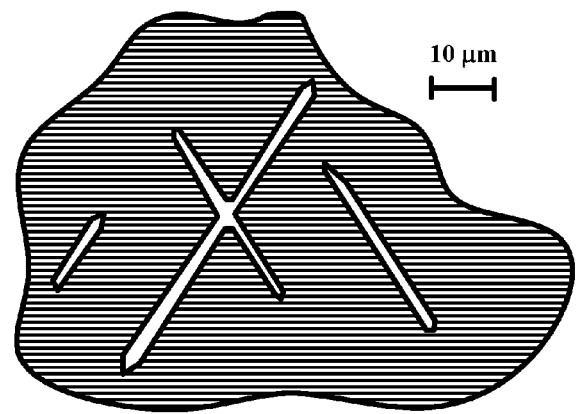
FIG. 8 shows a schematic section through the film parallel with its major surface, and represents the claimed microstructure with linear regions of broken P1 fibrils, where P2 has acquired an extra orientation.
Figure 10A:
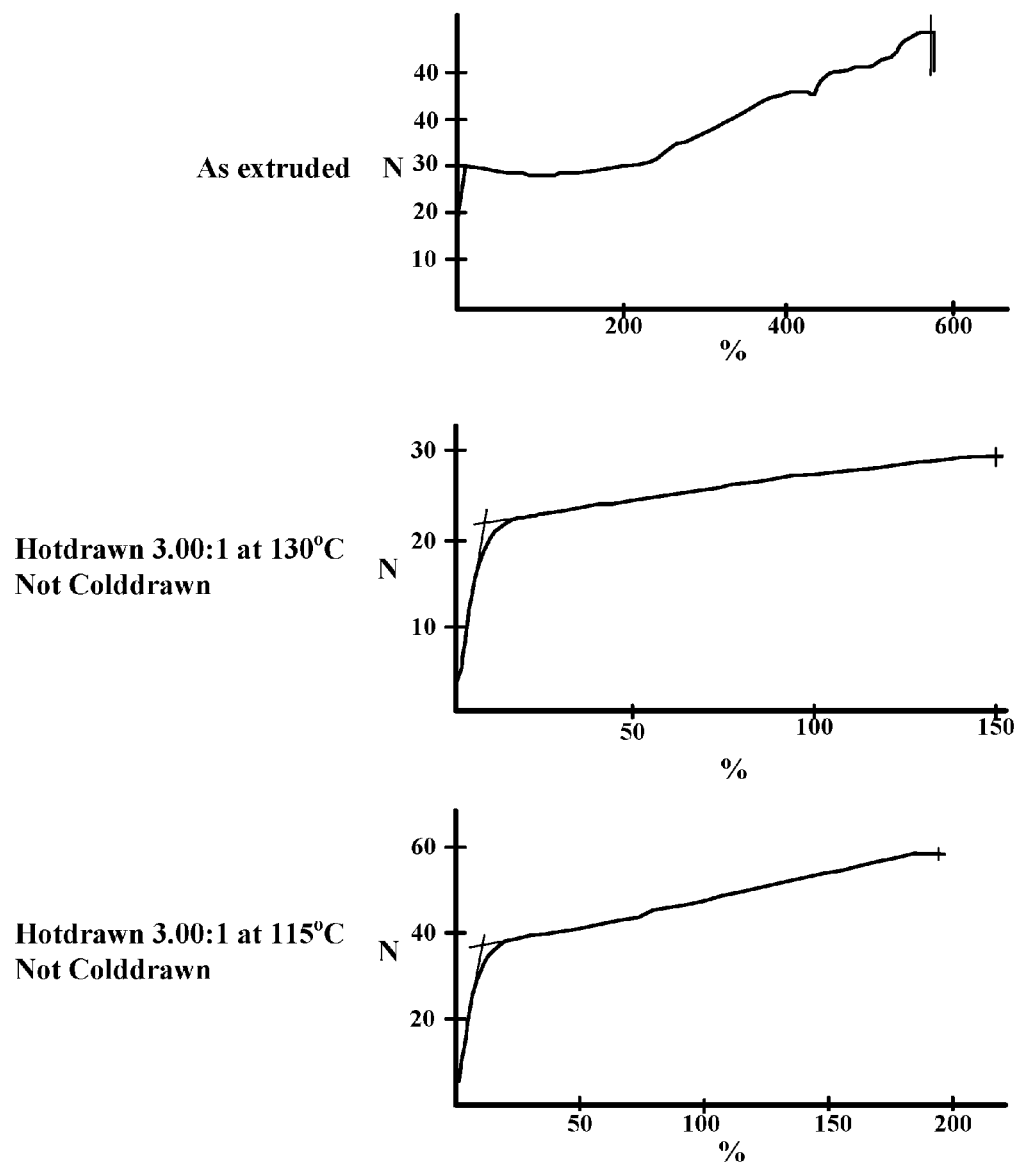
Figure 11A:
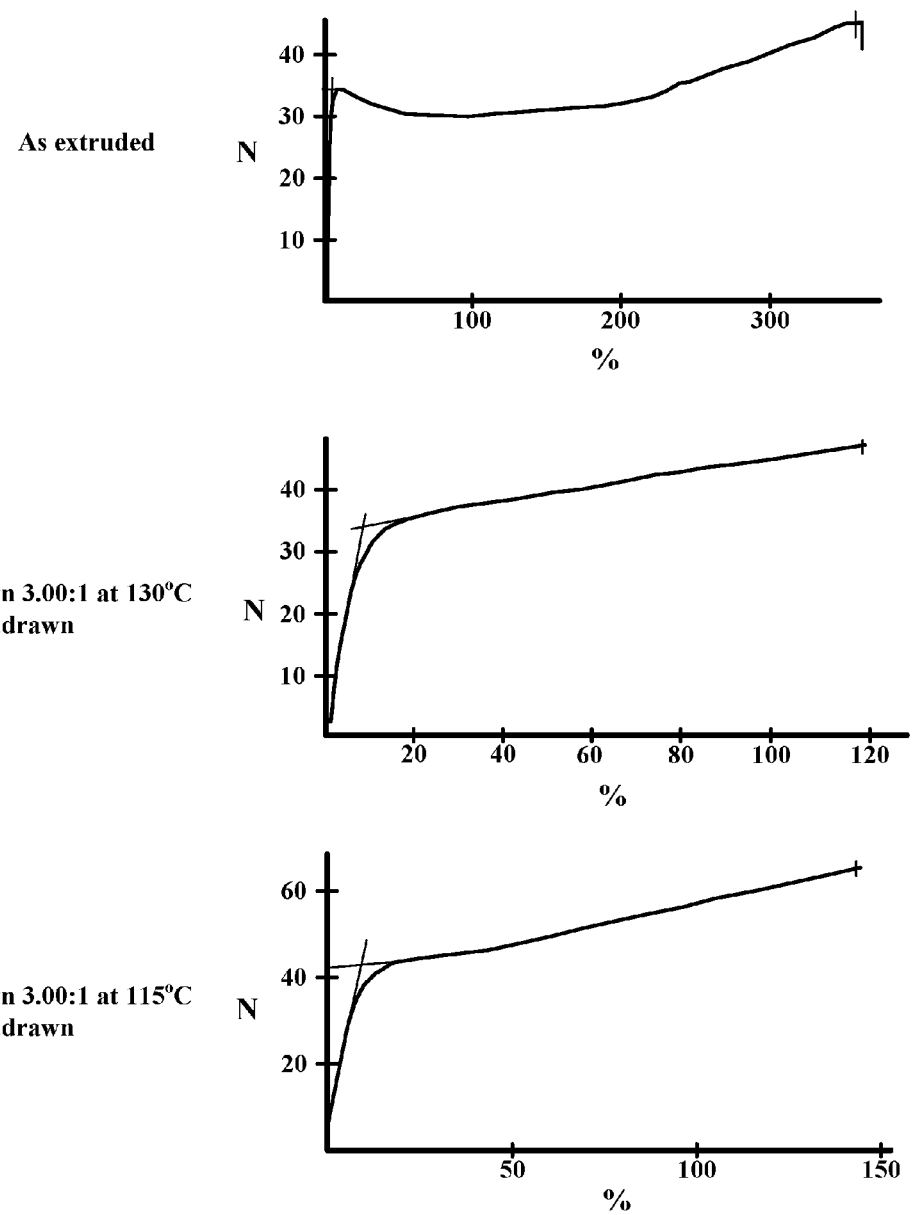

The structure shown in FIG. 8, which on the principle shows the claimed internal breaking of the P1 fibrils in transversely extending regions, and corresponding extra stretching of P2 in these regions, can be directly observed after solvent removal of P2, provided the flatness of the fibrils is insignificant, but as already mentioned, a significant flatness as obtained by use of the grid chamber makes the removal of P2 virtually impossible. In this case the study of the structure is difficult, but can be carried out by analysis of many sections, successively cut by microtome parallel with the orientation of the fibrils and perpendicular to the main surfaces of the film.

The invention also includes apparatus for carrying out the novel methods. In one aspect new apparatus for extruding thermoplastic material comprising a die having an exit orifice through which the molten material flows and stretching means for stretching the material after it is extruded by at least two steps, in the first of which the material is stretched longitudinally by first stretching means whilst at a high temperature, and in the second of which the material is stretched longitudinally by second stretching means at a lower temperature, comprising also means for cooling the extruded material between the two stretching means, said cooling means comprising a frictional device arranged for contact with the extruded material, characterized by further comprising stretching means downstream from said second stretching means, and additional cooling means between said second stretching means and said further stretching means.

In another aspect new apparatus for extruding thermoplastic material comprises a die having an exit orifice through which the molten material flows and stretching means for stretching the material after it is extruded by at least two steps, in the first of which the material is stretched longitudinally by first stretching means whilst at a high temperature, and in the second of which the material is stretched longitudinally by second stretching means at a lower temperature, comprising also means for cooling the extruded material between the two stretching means, said cooling means comprising a frictional device arranged for contact with the extruded material, characterized in that there is provided a grid chamber upstream from the exit orifice comprising one or more grids through which the extrudate passes, the grid or grids being located at a position in the chamber where the gap is wider than said exit orifice gap, the grid chamber further comprising a gap reduction portion between the grid or grids and the die exit wherein the gap is reduced at least part way to the gap of the exit orifice.

The preferred features of the new apparatus appear from the above description.

The following example illustrates a specific film formed by the invention and the analysis thereof.

EXAMPLE

Objectives: With blends of polypropylene (P1) and LLDPE (P2) the objectives are to demonstrate the effects of the invention in respect of the following:
  a) that a significant molecular orientation is maintained when the film has been heated to a temperature between the melting points of P2 and P1,
  b) that a significant improvement in yield point and creep properties is achieved without sacrificing the strength properties which are related to energy absorption,
  c) that the claimed morphology comprising very flat fine fibrils of P1 is achieved by use of the described gridchamber (FIGS. 3a,b and c),
  d) that the broken-fibril morphology, which in sketching manner is shown in FIG. 8, can be achieved. This is believed to be the basis of the improvements mentioned under b).

Polymer blends investigated: P1 is a copolymer of polypropylene (PP) having mechanical melting point 160° C. and melt-flow index 0.5 measured under the conditions normally used for PP P2 is LLDPE of d=0.92 and melt-flow index 1.00 measured under the conditions normally used for LLDPE The following blends are tried:
20% PP+80% LLLDPE,
33% PP+67% LLDPE,
50% PP+50% LLDPE.

Generally about the experimental production processes: This is carried out as a slow laboratory-scale or small pilot-scale process. Slow in order to enable temperature measurements directly on the film by means of a thermocouple and to make the adjustments easier.

After dry blending, the two polymers are melt blended and extruded by means of a small planetary screw extruder, constructed for experimental purposes. The process is continued in a flat die ending in a 2.5 mm wide and 300 mm long exit orifice. The die, which is not for coextrusion but for monoextrusion is supplied with a gridchamber with two lamellae formed grids generally as shown in FIGS. 3a,b and c. Immediately before and after the grids, and in the narrow space between them, the chamber is 20 mm high. The lamellae in the grids are placed under an angle of 60° to the main surfaces of the flow, they are each 1.0 mm thick and the spacing between adjacent lamellae is also 1.0 mm.

With the exceptions mentioned below, the process follows the route which is shown in FIG. 1 and FIG. 4. The route is interrupted as shown in FIG. 1, and the film is spooled up after each interruption. Following the first interruption the spooled-up film is again taken through rollers (206), (207), (208) and (209), which then are used to hold-back instead of pulling.

In order to allow direct measurements of film temperatures with a thermocouple, the upper part (219) is removed, but excessive pleating of the film while it passes the oven is avoided by having the surface of (213) rounded with a radius of 2500 mm (but 1000 mm at the two ends). The frictionally withholding device has the form shown in FIG. 5 with radius 0.2 mm.

The cold drawing (cold stretching) is carried out in primitive manner by drawing narrow, about 15 cm long specimens at 20° C. in a laboratory apparatus constructed for tensile testing.

Data re the process: All temperatures indicated in ° C.
Temperature of downstream end of extruder: 240°-250°.
Melt temperature at entrance to the die: 215°-220°.
Die temperature: 220°.
Temperature of rollers (206), (207) and (208) when used after extrusion: 10°.
Film thickness after melt-drawdown (attenuation): 0.3-0.35 mm.
Film velocity after melt-drawdown: 1.6 m/min.
Film velocity at entrance to hot stretching: 0.785 m/min.
Temperature of rollers (206), (207) and (208) when used to hold-back before hot stretching: 115°-120°.
Hot stretching ratio: 3.00:1 as adjusted by the velocity settings: only a few % shrinkage after relaxation.
Hot stretching temperatures: For each composition, two trials are carried out. In one trial referred to as "130° hotdrawing" film temperature immediately before the stretching bar (216) is 130°-140°, and the film temperature immediately after stretching bar (217) is 128° to 135°.
In another trial referred to as "115° hotdrawing" the film temperature immediately before the stretching bar (216) is 118°-123°, and the film temperature immediately after stretching bar (217) is 110°-120°.
Two series of cold stretching trials: In both series temperature 20°. In one series draw ratio 1.50:1, in the other 2.00:1, both ratios measured in relaxed state.

Investigations of Morphology Under Use of Scanning-electron Microscope

Specimens from 2 different samples are investigated. One consists of 33% PP and 67% LLDPE, the other of 50% of both polymers. In each case the film is hot stretched in the ratio 3.00:1 and cold stretched in the ratio 2.00:1.

The intent has been to dissolve out practically all LLDPE, and for this purpose several specimens are treated with 90° xylene for about 5 hours while they are supported by fine metal screens, one on each side of the specimen. However, very little LLDPE comes out due to the barrier effect of the flat PP fibrils. Investigations of one of the major surfaces in between 500-10,000 times magnification have showed the structure of flat fibrils, generally about 0.05-0.1 μm thick and about 10-20 times as wide as their thickness.

These investigations have been followed up by study of cross sections and longitudinal sections. The specimens have been assembled in clamps with the section to be studied in level with the clamp surfaces. So assembled they have been treated for 30 minutes in 90° warm xylene. After this the morphology has appeared in the SEM, and the above-mentioned dimensions have been confirmed. The micrographs of longitudinal sections also show the cross-sections of the regions where PP fibrils are broken (see the sketched representation in FIG. 8). These area appear as holes in the micrographs. They have a width which on the average is a few microns, and thickness on the average about 1 μm.

Strain/Stress Testing

These tests are carried out on samples from each of the compositions: 20% PP, 33% PP and 50% PP. The strain/stress graphs are recorded as FIGS. 9a-c, 10a-c and 11a-c. For each composition a strain/stress graph is established for samples stretched under the conditions which appear from the following table.

"As extruded" means as taken up on a reel after melt attenuation and before hot drawing "130°" means hot stretched in ratio 3.00:1 when LLDPE is clearly molten, at around 130° C. "115°" means hot stretched in ratio 1.50:1 when LLDPE is semisolid, at around 115° C., "1:1" means no cold stretching. "1.5:1" means stretched at 20° C. in ratio 1.50:1. "2:1" means stretched at 20° C. in ratio 2.00:1. There is only tested one specimen for each combination of the conditions appearing in the left column. The elongation rate is set very low namely corresponding to an elongation of 50% per minute.

In the cases when the film first has been "hotdrawn" either around 130° C. or around 115° C., and then "colddrawn" either in ratio 1.5:1 or 2:1, the yield phenomenon appears very unusual, especially in view of the low velocity. As it is seen from the graphs there is a wide elastic range, namely up to 22-30% elongation, and within that range the film is rather close to follow Hook's law. Above the elastic limit the tension raises smoothly, and there still exists a wide range of elongation before the sample breaks. To the knowledge of the inventor a similar behavior of plastic film is not known. Normally there will be an unsharp and very velocity dependent change from elastic to permanent deformations, or, if the film has been highly oriented, the test will take it directly from elastic elongation to break.

The values of elastic limit and yield force recorded in the table, has been established from the graphs by a simple geometrical interpolation, which appears from the figures.

In order directly to check that the values indicated in the table as "elastic limit" really were so, each of the samples which showed high values of this property was elongated up to 2% below the value found from the graph, kept at this elongation for about 30 seconds, and relaxed again. it then returned to its original length.

The inventor believes that this form of the strain/stress graph is a result of the microstructure shown in FIG. 8, in which there is highly overstretched LLDPE in the regions where the PP fibrils are broken, while the LLDPE is stretched much less than the PP outside these regions. The change from elastic to permanent deformation means that the rupturing of the PP fibrils begins to propagate. The very sharp change from elastic to permanent deformation will show as a high creep resistance.

Shrink Testing

The samples which were strain/stress tested (apart from the "as extruded" samples) have also been tested for free shrinkage under a gradual heating from slightly elevated temperatures to 180° C., whereby the readings began at 90° C.

Tested were also three samples (20% PP, 33% PP and 50% PP) which had not been hotdrawn but were cold drawn in ratio 3.00:1 at 20° C. The test results are recorded in FIGS. 12a-d.

The testing was carried out on a heated metal plate of the type used for determination of melting points. The temperature was measured on the plate surface with a thermocouple. The specimens were held towards the plate by an object glass (made for microscopy). Plate, specimens and object glass were carefully lubricated with talc. Two specimens from the same sample were always tested simultaneously, and the values of shrinkage shown in the graphs are averages between the readings from the two specimens.

Figure 12A:
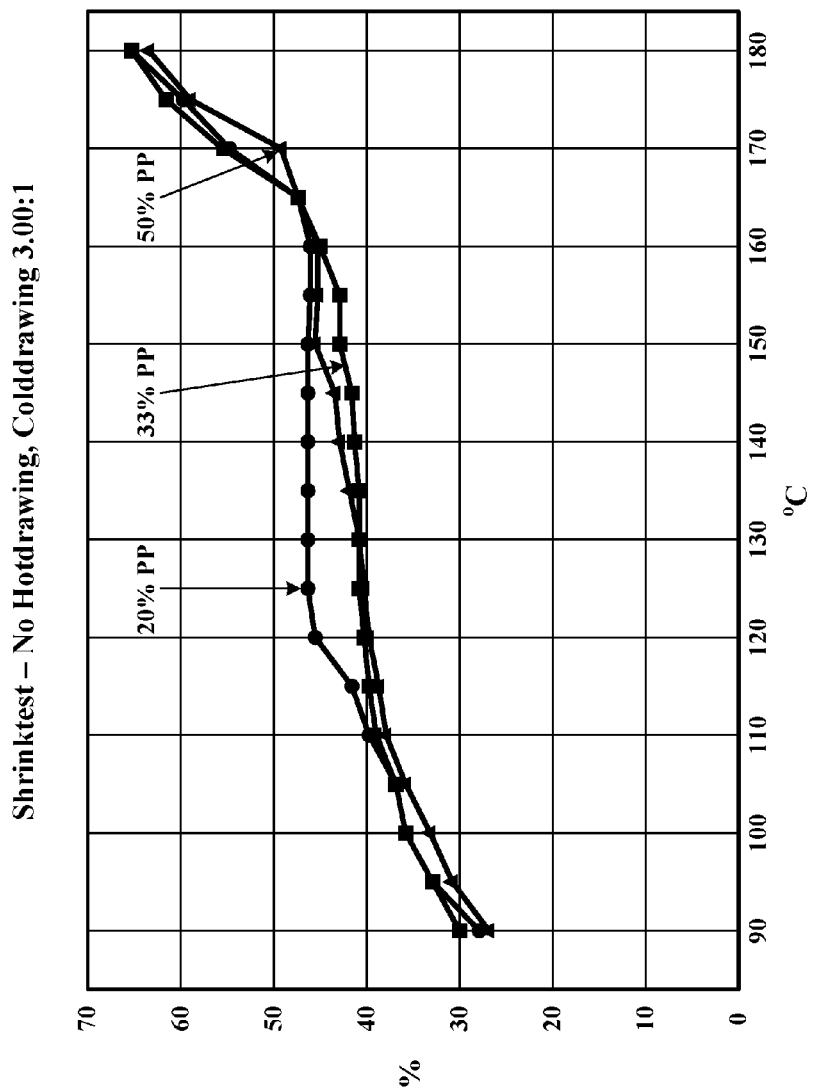
Figure 12C:
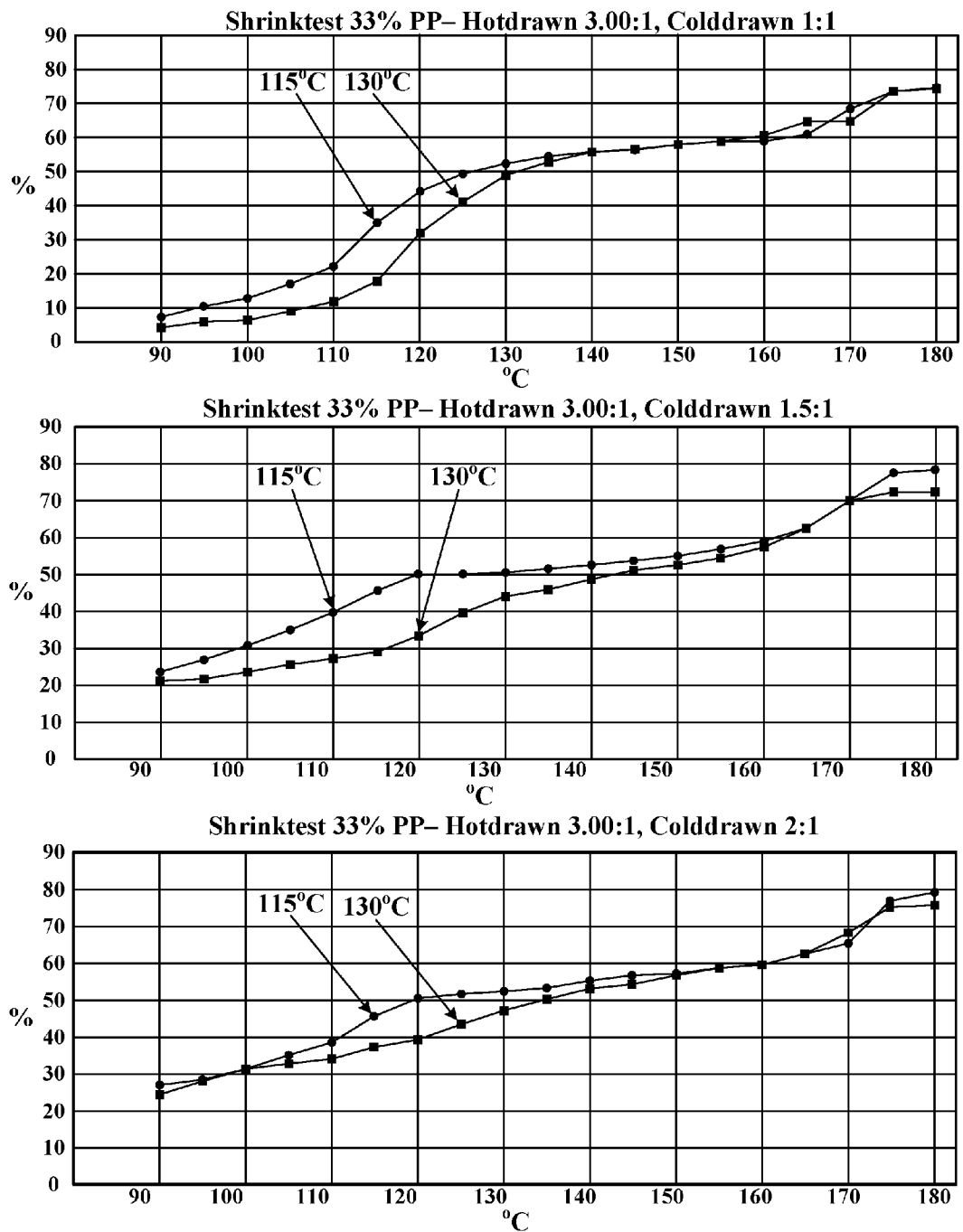

All of the graphs in FIGS. 12b-d show the shrinkage of two different samples, one hotdrawn at about 130° C., i.e. while the LLDPE clearly was molten, and tone hotdrawn at 115° C., i.e. while LLDPE was semisolid. "Colddrawn 1:1" means not cold stretched at all.

All graphs show three different regions, one below the melting point of LLDPE, a second between this melting point and the melting point of the PP, and a third above the melting point of the PP.

Studying the shrinkage 20% PP sample in FIG. 12a, there is simply zero shrinkage in the second region, that means the forces of shrinkage exerted by the LLDPE molecules from 90° to 120° essentially eliminated the orientation of the PP molecules. For the corresponding samples with 33% of PP and with 50% PP, the result was not quite but almost the same. Thus, all molecular orientation which essentially contributor to the strength is lost above the melting point of LLDPE. There is some melt orientation left in the PP which causes essential shrinkage above the melting point of PP, but since this only is melt orientation it can not considerably contribute to strength.

In each of the nine double-graphs shown in FIGS. 12b-d, the shrinkage of film which has been hotdrawn slightly above the melting point of LLDPE, can be directly compared with similar film hotdrawn slightly below this melting point.

It is the shrinkage by heating from 125° C. to 160° C. seen in relation to the sample length at 125° C., which indicates how much orientation is left in PP when LLDPE has lost all its orientation. In all cases it is clear that the sample which is hotdrawn above the melting point of LLDPE in that respect is superior to the sample which is hotdrawn beneath that melting point.

a second polymer phase comprising a matrix of a second polymer P2 in which the fibrils of the first polymer P1 are dispersed and alloyed, and at least 4 die lines are substantially parallel with main surfaces of the film, where:

the polymers P1 and P2 are at least partly crystalline at temperatures less than 100° C., the polymer P2, in its unoriented state at 20° C., exhibits a coefficient of elasticity (E1), while the polymer P1, in its unoriented state at 20° C., exhibits a coefficient of elasticity (E2) that is at least 15% lower than E1, the polymers P1 and P2 are compatible or compatibilized during extrusion and have a compatibility of the two polymers P1 and P2 is sufficient to prevent internal voids from forming in the film upon repeated flexing, and each fibril extends substantially in one direction, has a mean width less than or equal to about 5 µm, has a mean thickness less than or equal to about 5 µm, are flat, and is substantially parallel to main surfaces of the film.

2. The film according to claim 1, further comprising a minor coextruded surface layer on at least one side of the layer to enhance bonding properties and/or modify frictional properties of the film.

3. The film according to claim 2, wherein the polymer P1 comprises polypropylene, polyamide or polyethylene terephthalate, and the polymer P2 comprises a propylene copolymer, or polyethylene.

4. The film according to claim 3, wherein the polypropylene comprises a crystalline copolymer of propylene.

5. The film according to claim 3, wherein the polyethylene comprises a copolymer of ethylene.

6. The film according to claim 1, wherein the film is in the form of a crosslaminate.

7. The film according to claim 1, wherein the film is in the form of a rope, twine or woven-tape product.

| | Sample | Elastic Limit (%) | Width (mm) | Thinness (mm) | Cross area (mm$^2$) | Yield Force (N) | Elongation at Break (%) | Breaking Force (N) | Yield Tension (MPa) | Ultimate Tensile Strength (MPa) |
|---|---|---|---|---|---|---|---|---|---|---|
| PP20 % | As extruded | 10.0 | 6.0 | 0.340 | 2.040 | 18.5 | (640.0) | (43.5) | 9.1 | (21.3) |
| | 115°/1:1 | 10.0 | 6.0 | 0.112 | 0.672 | 12.0 | 230.0 | 27.0 | 17.9 | 40.2 |
| | 115°/1.5:1 | 25.0 | 6.0 | 0.113 | 0.678 | 24.9 | 129.0 | 35.5 | 36.7 | 52.4 |
| | 115°/2:1 | 24.5 | 6.0 | 0.081 | 0.486 | 32.8 | 57.6 | 40.0 | 67.5 | 82.3 |
| | 130°/1:1 | 8.0 | 6.0 | 0.312 | 1.872 | 13.4 | (344.0) | (24.3) | 7.2 | (13.0) |
| | 130°/1.5:1 | 30.0 | 6.0 | 0.107 | 0.642 | 20.2 | 206.0 | 26.7 | 31.5 | 41.6 |
| | 130°/2:1 | 30.0 | 6.0 | 0.095 | 0.570 | 25.1 | 202.0 | 39.6 | 44.0 | 69.5 |
| PP33 % | As extruded | 10.0 | 6.0 | 0.365 | 2.190 | 29.3 | 570.0 | 58.0 | 13.4 | 26.5 |
| | 115°/1:1 | 9.8 | 6.0 | 0.105 | 0.630 | 35.6 | 133.0 | 62.0 | 56.5 | 98.4 |
| | 115°/1.5:1 | 23.0 | 6.0 | 0.128 | 0.768 | 44.8 | 92.0 | 57.5 | 58.3 | 74.9 |
| | 115°/2:1 | 22.9 | 5.3 | 0.103 | 0.546 | 70.0 | 49.2 | 79.0 | 128.2 | 144.7 |
| | 130°/1:1 | 8.0 | 6.0 | 0.137 | 0.822 | 22.1 | 151.0 | 30.6 | 26.9 | 37.2 |
| | 130°/1.5:1 | 30.0 | 6.0 | 0.152 | 0.912 | 34.1 | 263.0 | 48.7 | 37.4 | 53.4 |
| | 130°/2:1 | 30.0 | 6.0 | 0.131 | 0.786 | 51.0 | 89.0 | 56.0 | 64.9 | 71.3 |
| PP50 % | As extruded | 6.0 | 6.0 | 0.355 | 2.130 | 34.2 | 360.0 | 44.4 | 16.1 | 20.9 |
| | 115°/1:1 | 3.5 | 6.0 | 0.148 | 0.888 | 42.5 | 144.7 | 64.1 | 47.9 | 72.2 |
| | 115°/1.5:1 | 22.0 | 6.0 | 0.112 | 0.672 | 65.9 | 54.0 | 72.0 | 98.1 | 107.1 |
| | 115°/2:1 | 23.0 | 5.5 | 0.104 | 0.572 | 82.5 | 57.0 | 93.0 | 144.2 | 162.6 |
| | 130°/1:1 | 9.2 | 6.0 | 0.148 | 0.888 | 33.9 | 123 | 46.0 | 38.2 | 51.8 |
| | 130°/1.5:1 | 27.0 | 6.0 | 0.125 | 0.750 | 46.2 | 65.0 | 50.0 | 61.6 | 66.7 |
| | 130°/2:1 | 25.0 | 6.0 | 0.119 | 0.714 | 72.5 | 39.2 | 73.8 | 101.5 | 103.4 |

Strain/Stress Investigations

The invention claimed is:

1. A film comprising:
a layer comprising a polymer alloy composition comprising:
a first polymer phase comprising microscopic fine fibrils of a first polymer P1, and 8. A film comprising:
a layer comprising a polymer alloy composition comprising:
a first polymer phase comprising microscopic fine fibrils of a first polymer P1, a second polymer phase comprising a matrix of a second polymer P2 in which the fibrils the first polymer P1 are dispersed and alloyed, and at least 4 die lines are substantially parallel to main surfaces of the film making an angle of about 1 o or less relative to the main surfaces, where:

the polymers P1 and P2 are at least partly crystalline at temperatures less than 100° C., the polymer P2, in its unoriented state at 20° C., exhibits a coefficient of elasticity (E1), while the polymer P1, in its unoriented state at 20° C., exhibits a coefficient of elasticity (E2) that is at least 15% lower than E1, the polymers P1 and P2 are compatible or compatibilized during extrusion and have a compatibility of the two polymers P1 and P2 is sufficient to prevent internal voids from forming in the film upon repeated flexing, each fibril extends substantially in one direction, is flat, is substantially parallel with the main surfaces of the film, has a thicknesses less than or equal to about 0.5 µm, has a width at least 5 times the thickness, and has a mean of the width and the thickness less than or equal to about 5 pm.

9. The film according to claim 8, further comprising a minor coextruded surface layer on at least one side of the layer to enhance bonding properties and/or modify frictional properties.

10. The film according to claim 8, wherein the polymer P1 comprises EVOH, vinylidene chloride polymers or polyamide.

11. The film according to claim 8, wherein the film is uniaxially or biaxially oriented and is laminated to another oriented film, whereby the main directions of orientation cross each other.

12. A cellular expanded film comprising:

a layer comprising a polymer alloy composition comprising:

a first polymer phase comprising microscopic fine fibrils of a first polymer P1, a second polymer phase comprising a matrix of a second polymer P2 in which the fibrils are dispersed and alloyed, at least 4 die lines are substantially parallel to main surfaces of the film making an angle of about 1° or less relative to the main surfaces, and a volatile expansion agent that is soluble in the polymer P2 and insoluble in the polymer P1, where:

the polymers P1 and P2 are at least partly crystalline at temperatures less than 100° C., the polymer P2, in its unoriented state at 20° C., exhibits a coefficient of elasticity (El), while the polymer P1, in its unoriented state at 20° C., exhibits a coefficient of elasticity (E2) that is at least 15% lower than E1, the polymers P1 and P2 are compatible or compatibilized during extrusion and have a compatibility of the two polymers P1 and P2 is sufficient to prevent internal voids from forming in the film upon repeated flexing, the volatile expansion agent expands to form a fine cellular expanded structure in the film, and each fibril extends substantially in one direction, has a mean width less than or equal to about 5 µm, has a mean thickness less than or equal to about 5 µm, are flat, and is substantially parallel to main surfaces of the film.

13. The film according to claim 12, wherein the film is uniaxially or biaxially oriented and is laminated to another film, where the main directions of orientation cross each other.

14. The film according to claim 12, wherein the film is in the form of a rope, a twine or a woven-tape product.

15. The film according to claim 12, wherein the film is in the form of a split fiber product.

16. The film according to claim 12, wherein the polymer P2 in its unoriented state at 20° C. exhibits a coefficient of elasticity (E1) which is at least 15% lower than a coefficient of elasticity (E2) of the polymer P1.

17. The film according to claim 8, wherein the polymer P2 comprises a copolymer of propylene or polyethylene.

18. The film according to claim 8, wherein, in the alloy, a weight proportion of the polymer P1 is in the range 5 to 75%.

19. The film according to claim 1, wherein the width of the fibrils is at least 10 times the thickness.

20. An extruded oriented film comprising:

a layer including:

an extrusion formed polymer alloy comprising:

a dispersion of microscopically crystalline or semicrystalline fine fibrils of a polymer P1 surrounded by a polymer P2, at least 4 die lines are substantially parallel to main surfaces of the film making an angle of about 1° or less relative thereto, and where the fibrils extend substantially in one direction, have a thickness less than or equal to about 1 µm, have a width at least 5 times the thickness, have a mean of the width and the thickness less than or equal to about 5µum, are flat, and are substantially parallel with the main surfaces of the film due to extruding the blend through the exit orifice of the extrusion, and where the polymer P1 and the polymer P2 are different and are at least partly crystalline at temperatures less than 100° C. and are compatible or compatibilized during extrusion, where the compatibility is sufficient so that the film does not develop internal voids upon repeated flexing of the film, and where the polymer P2, in its unoriented state at 20° C., exhibits a coefficient of elasticity (E1) which is at least 15% lower than a coefficient of elasticity (E2) of the polymer P1.

21. The film according to claim 20, wherein the film further comprises a minor coextruded surface layer on at least one side of the alloy layer to enhance bonding properties and/or modify frictional properties of the film.

22. The film according to claim 21, wherein the polymer P1 comprises polypropylene, polyamide or polyethylene terephthalate, and the polymer P2 comprises a propylene copolymer, or polyethylene.

23. The film according to claim 22, wherein the polypropylene comprisess a crystalline copolymer of propylene.

24. The film according to claim 22, wherein the polyethylene comprises a copolymer of ethylene.

25. The film according to claim 20, wherein the film is in the form of a crosslaminate.

26. The film according to claim 20, wherein the film is in the form of a rope, twine or woven-tape product.

27. An extruded oriented film comprising:
a layer including:
an extrusion formed polymer alloy comprising:
a dispersion of microscopically crystalline or semi-crystalline fine fibrils of a polymer P1 surrounded by a polymer P2, and
at least 4 die lines are substantially parallel to main surfaces of the film making an angle of about 1° or less relative to the main surfaces,
where the fibrils extend substantially in one direction, have a thickness less than or equal to about 1 µm, a width at least 5 times its thickness, and have a mean of the width and the thickness less than or equal to about 5 µm due to extruding the blend through the exit orifice of the extrusion,
where the polymer P1 and the polymer P2 are different and are at least partly crystalline at temperatures less than 100° C. and are compatible or compatibilized during extrusion, where the compatibility is sufficient so that the film does not develop internal voids upon repeated flexing of the film, and
where the polymer P2 in its unoriented state at 20° C. exhibits a coefficient of elasticity (E1) which is at least 15% lower than a coefficient of elasticity (E2) of the polymer P1, and
locations of rupture of the polymer P1 fibrils,
where the locations of rupture extend in a substantially linear fashion across the film at an angle to the direction of orientation of the fibrils and comprise the polymer P2.

28. The film according to claim 27, wherein the film further comprises a minor coextruded surface layer on at least one side of the alloy layer to enhance bonding properties and/or modify frictional properties of the film.

29. The film according to claim 28, wherein the polymer P1 comprises polypropylene, polyamide or polyethylene terephthalate, and the polymer P2 comprises a propylene copolymer, or polyethylene.

30. The film according to claim 29, wherein the polypropylene comprises a crystalline copolymer of propylene.

31. The film according to claim 29, wherein the polyethylene comprises a copolymer of ethylene.

32. The film according to claim 27, wherein the film is in the form of a crosslaminate.

33. The film according to claim 27, wherein the film is in the form of a rope, twine or woven-tape product.

34. An extruded oriented film comprising:
a layer including:
an extrusion formed polymer alloy comprising:
a dispersion of microscopically crystalline or semi-crystalline fine fibrils of a polymer P1 surrounded by a polymer P2,
at least 4 die lines are substantially parallel to main surfaces of the film making an angle of about 1° or less relative to the main surfaces,
where the fibrils extend substantially in one direction, have a thickness less than or equal to about +0.5 µm, a width at least 5 times the thickness, have a mean of the width and the thickness less than or equal to about 5µum, are flat and are substantially parallel with the main surfaces of the film due to extruding the blend through the exit orifice of the extrusion,
where the polymer P1 and the polymer P2 are different and are at least partly crystalline at temperatures less than 100° C. and are compatible or compatibilized during extrusion, where the compatibility is sufficient so that the film does not develop internal voids upon repeated flexing of the film, and
where the polymer P2 in its unoriented state at 20° C. exhibits a coefficient of elasticity (E1) which is at least 15% lower than a coefficient of elasticity (E2) of the polymer P1, and
locations of rupture of the polymer P1 fibrils,
where the locations of rupture extend in a substantially linear fashion across the film at an angle to the direction of orientation of the fibrils and comprise the polymer P2.

35. The film according to claim 34, wherein the film further comprises a minor coextruded surface layer on at least one side of the alloy layer to enhance bonding properties and/or modify frictional properties of the film.

36. The film according to claim 35, wherein the polymer P1 comprises polypropylene, polyamide or polyethylene terephthalate, and the polymer P2 comprises a propylene copolymer, or polyethylene.

37. The film according to claim 36, wherein the polypropylene comprises a crystalline copolymer of propylene.

38. The film according to claim 36, wherein the polyethylene comprises a copolymer of ethylene.

39. The film according to claim .34, wherein the film is in the form of a crosslaminate.

40. The film according to claim 34, wherein the film is in the form of a rope, twine or woven-tape product.

41. The film according to claim 1, wherein the fibrils are broken at locations in the film.

42. The film according to claim 8, wherein the fibrils are broken at locations in the film.

43. The film according to claim 12, wherein the fibrils are broken at locations in the film.

44. The film according to claim 20, wherein the fibrils are broken at locations in the film.

45. The film according to claim 27, wherein the fibrils are broken at locations in the film.

46. The film according to claim 34, wherein the fibrils are broken at locations in the film.

* * * * *